US008564751B2

(12) United States Patent
Nakanishi et al.

(10) Patent No.: US 8,564,751 B2
(45) Date of Patent: Oct. 22, 2013

(54) LIQUID CRYSTAL DISPLAY DEVICE

(75) Inventors: Yohei Nakanishi, Osaka (JP);
Masanobu Mizusaki, Osaka (JP);
Takashi Katayama, Osaka (JP); Yuichi Kawahira, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 106 days.

(21) Appl. No.: 13/264,801

(22) PCT Filed: Apr. 12, 2010

(86) PCT No.: PCT/JP2010/002646
§ 371 (c)(1),
(2), (4) Date: Oct. 17, 2011

(87) PCT Pub. No.: WO2010/119660
PCT Pub. Date: Oct. 21, 2010

(65) Prior Publication Data
US 2012/0033158 A1  Feb. 9, 2012

(30) Foreign Application Priority Data

Apr. 17, 2009 (JP) .................................. 2009-101273

(51) Int. Cl.
*G02F 1/1337* (2006.01)

(52) U.S. Cl.
USPC .......................................... 349/129; 349/130

(58) Field of Classification Search
USPC ................................................. 349/129–130
See application file for complete search history.

(56) References Cited

U.S. PATENT DOCUMENTS 6,369,870 B1 * 4/2002 Koma ........................... 349/130
6,567,144 B1 5/2003 Kim et al.

(Continued)

FOREIGN PATENT DOCUMENTS

JP 8-015678 1/1996
JP 9-281497 10/1997

(Continued)

OTHER PUBLICATIONS

International Preliminary Report on Patentability mailed Nov. 24, 2011 in corresponding PCT Application No. PCT/JP2010/002646.

(Continued)

*Primary Examiner* — James Dudek
(74) *Attorney, Agent, or Firm* — Nixon & Vanderhye P.C.

(57) ABSTRACT

A VA-mode liquid crystal display device having a high display quality is provided. A liquid crystal display device according to the present invention includes a vertical alignment type liquid crystal layer; a first substrate and a second substrate facing each other with the liquid crystal layer interposed therebetween; a first electrode provided in the first substrate on the liquid crystal layer side and a second electrode provided in the second substrate on the liquid crystal layer side; and a first alignment film provided between the first electrode and the liquid crystal layer and a second alignment film provided between the second electrode and the liquid crystal layer. The liquid crystal display device includes a plurality of pixel areas located in a matrix. Each of the plurality of pixel areas includes a first liquid crystal domain in which a tilt direction of liquid crystal molecules at the center and in the vicinity thereof in a layer plane and in a thickness direction of the liquid crystal layer when a voltage is applied between the first electrode and the second electrode is a predetermined first direction, a second liquid crystal domain in which such a tilt direction is a predetermined second direction, a third liquid crystal domain in which such a tilt direction is predetermined third direction and a fourth liquid crystal domain in which such a tilt direction is a predetermined fourth direction; a difference between any two among the first direction, the second direction, the third direction and the fourth direction is approximately equal to an integral multiple of 90 degrees.

17 Claims, 19 Drawing Sheets

(56) References Cited

U.S. PATENT DOCUMENTS

| | | |
|---|---|---|
| 6,583,835 B1 | 6/2003 | Yoshida et al. |
| 7,113,241 B2 | 9/2006 | Hanaoka |
| 7,136,140 B1 | 11/2006 | Inoue et al. |
| 2004/0119924 A1 | 6/2004 | Takeda et al. |
| 2005/0200789 A1 | 9/2005 | Nakanishi |
| 2006/0139542 A1 | 6/2006 | Ando et al. |
| 2012/0033159 A1 | 2/2012 | Inoue et al. |

FOREIGN PATENT DOCUMENTS

| | | |
|---|---|---|
| JP | 11-242225 | 9/1999 |
| JP | 2001-108994 | 4/2001 |
| JP | 2002-098967 | 4/2002 |
| JP | 2004-163746 | 6/2004 |
| JP | 2005-258194 | 9/2005 |
| JP | 2006-184335 | 7/2006 |
| JP | 2008-145700 | 6/2008 |

OTHER PUBLICATIONS

International Search Report for PCT/JP2010/002645 mailed May 25, 2010.

International Preliminary Report on Patentability mailed Nov. 24, 2011 in PCT Application No. PCT/JP2010/002645.

International Search Report for PCT/JP2010/002646, mailed May 25, 2010.

Office Action issued in U.S. Appl. No. 13/264,851 dated Apr. 4, 2013.

* cited by examiner (a)

(b)

(c)

(a) TFT SUBSTRATE SIDE (b) CF SUBSTRATE SIDE (c) LIQUID CRYSTAL LAYER

LIQUID CRYSTAL DISPLAY DEVICE

This application is the U.S. national phase of International Application No. PCT/JP2010/002646, filed 12 Apr. 2010, which designated the U.S. and claims priority to JP Application No. 2009-101273, filed 17 Apr. 2009, the entire contents of each of which are hereby incorporated by reference.

TECHNICAL FIELD

The present invention relates to a liquid crystal display device, and specifically a liquid crystal display device having wide viewing angle characteristics.

BACKGROUND ART

Liquid crystal display devices have been improved in terms of display characteristics, and are now used for TV receivers and the like more and more widely. The viewing angle characteristics of the liquid crystal display devices have been improved but are desired to be further improved. Especially, the viewing angle characteristics of liquid crystal display devices using a vertical alignment type liquid crystal layer (also referred to as the "VA-mode liquid crystal display devices") are strongly desired to be improved.

VA-mode liquid crystal display devices currently used for large display devices of TVs and the like adopt a multi-domain structure in which a plurality of liquid crystal domains are formed in one pixel in order to improve the viewing angle characteristics. A mainly used method for forming the multi-domain structure is an MVA mode. The MVA mode is disclosed in, for example, Patent Document 1.

According to the MVA mode, a pair of substrates facing each other with a vertical alignment type liquid crystal layer interposed therebetween each include an alignment regulation structure on a surface thereof on the liquid crystal layer side. Owing to such alignment regulation structures, a plurality of domains having different alignment directions (tilt directions) of liquid crystal molecules (typically, there are four types of alignment directions) are formed in each pixel area. As the alignment regulation structures, slits (openings) or ribs (protrusion structures) provided in or on electrodes are used, and an alignment regulation force is exerted from both sides of the liquid crystal layer.

However, in the case where the slits or ribs are used, unlike in the case where the pretilt directions are defined by alignment films used in the conventional TN mode, the alignment regulation force on the liquid crystal molecules is nonuniform in the pixel area because the slits and ribs are linear. This causes a problem that, for example, there occurs a response speed distribution. There is another problem that since the light transmittance of an area where the slits or ribs are provided is lowered, the display luminance is decreased.

CITATION LIST

Patent Literature

Patent Document 1: Japanese Laid-Open Patent Publication No. 11-242225

SUMMARY OF INVENTION

Technical Problem

In order to avoid the above-described problems, it is preferable that even in a VA-mode liquid crystal display device, the multi-domain structure is formed by defining the pretilt direction by means of alignment films. However, as a result of various studies, the present inventors found that when the multi-domain structure is formed by such a method, alignment disturbance unique to VA-mode liquid crystal display devices occurs and the display quality is lowered. Specifically, in the vicinity of an edge of a pixel electrode, an area darker than the remaining area (dark line) appears parallel to the edge, and this lowers the transmittance.

The present invention made in light of these problems has an object of providing a VA-mode liquid crystal display device having a high display quality.

Solution to Problem

A liquid crystal display device according to the present invention includes a vertical alignment type liquid crystal layer; a first substrate and a second substrate facing each other with the liquid crystal layer interposed therebetween; a first electrode provided in the first substrate on the liquid crystal layer side and a second electrode provided in the second substrate on the liquid crystal layer side; and a first alignment film provided between the first electrode and the liquid crystal layer and a second alignment film provided between the second electrode and the liquid crystal layer. The liquid crystal display device includes a plurality of pixel areas located in a matrix. Each of the plurality of pixel areas includes a first liquid crystal domain in which a tilt direction of liquid crystal molecules at the center and in the vicinity thereof in a layer plane and in a thickness direction of the liquid crystal layer when a voltage is applied between the first electrode and the second electrode is a predetermined first direction, a second liquid crystal domain in which such a tilt direction is a predetermined second direction, a third liquid crystal domain in which such a tilt direction is a predetermined third direction and a fourth liquid crystal domain in which such a tilt direction is a predetermined fourth direction; a difference between any two among the first direction, the second direction, the third direction and the fourth direction is approximately equal to an integral multiple of 90°; the first liquid crystal domain is close to at least a part of edges of the first electrode, and the at least a part includes a first edge portion, wherein an azimuthal angle component of an alignment regulation force caused by an oblique electric field generated in the vicinity of the first edge portion and an azimuthal angle component of an alignment regulation force caused by the second alignment film are opposite to each other; and the second substrate includes a first rib provided in an area corresponding to the first edge portion.

In a preferable embodiment, the first direction has an angle exceeding 90° with respect to an azimuthal angle direction perpendicular to the first edge portion and directed to the inside of the first electrode.

In a preferable embodiment, the first rib includes an inclining first side face, an inclining second side face located outer to the first side face, and an apex defined between the first side face and the second side face; and the first rib is located such that the apex is located outer to the first edge portion and that the first edge portion overlaps the first side face.

In a preferable embodiment, a height h (μm) of the first rib, a width w (μm) of the first rib and a thickness d (μm) of the liquid crystal layer fulfill the relationship of the following expression 1:

$$5d \cdot \exp(-0.18w) \le h \le 12d \cdot \exp(-0.13w) \quad (1)$$

In a preferable embodiment, the height h (μm) of the first rib, the width w (μm) of the first rib and the thickness d (μm)

of the liquid crystal layer fulfill the relationships of the following expressions (2), (3) and (4):

$$2 \leq d \leq 6 \quad (2)$$

$$10 \leq w \leq 30 \quad (3)$$

$$0.6 \leq h \leq d \quad (4)$$

In a preferable embodiment, the first edge portion is generally parallel to a vertical direction of a display plane.

In a preferable embodiment, the second liquid crystal domain is close to at least a part of the edges of the first electrode, and the at least a part includes a second edge portion, wherein an azimuthal angle component of an alignment regulation force caused by an oblique electric field generated in the vicinity of the second edge portion and an azimuthal angle component of an alignment regulation force caused by the second alignment film are opposite to each other; and the second substrate includes a second rib provided in an area corresponding to the second edge portion.

In a preferable embodiment, the first direction and the second direction make an angle of about 180° with respect to each other.

In a preferable embodiment, the first edge portion and the second edge portion are generally parallel to the vertical direction of the display plane.

In a preferable embodiment, the first liquid crystal domain, the second liquid crystal domain, the third liquid crystal domain and the fourth liquid crystal domain are each adjacent to the others of the liquid crystal domains and are located in a matrix of 2 rows×2 columns.

In a preferable embodiment, the first liquid crystal domain, the second liquid crystal domain, the third liquid crystal domain and the fourth liquid crystal domain are located such that the tilt directions in adjacent liquid crystal domains among the first through fourth liquid crystal domains are different by 90° from each other.

In a preferable embodiment, where an azimuthal angle of a horizontal direction of the display plane is 0°, the first direction is about 45°, about 135°, about 225° about 315°.

In a preferable embodiment, the third liquid crystal domain is close to at least a part of edges of the first electrode, and the at least a part includes a third edge portion, wherein an azimuthal angle component of an alignment regulation force caused by an oblique electric field generated in the vicinity of the third edge portion and an azimuthal angle component of an alignment regulation force caused by the second alignment film are opposite to each other; the fourth liquid crystal domain is close to at least a part of edges of the first electrode, and the at least a part includes a fourth edge portion, wherein an azimuthal angle component of an alignment regulation force caused by an oblique electric field generated in the vicinity of the fourth edge portion and an azimuthal angle component of an alignment regulation force caused by the second alignment film are opposite to each other; and the second substrate includes a third rib provided in an area corresponding to the third edge portion and a fourth rib provided in an area corresponding to the fourth edge portion.

In a preferable embodiment, the liquid crystal display device according to the present invention further includes a pair of polarizing plates facing each other with the liquid crystal layer interposed therebetween and located such that transmission axes thereof are generally perpendicular to each other. The first direction, the second direction, the third direction and the fourth direction each make an angle of about 45° with respect to the transmission axes of the pair of polarizing plates.

In a preferable embodiment, the liquid crystal layer contains the liquid crystal molecules having a negative dielectric anisotropy; and a pretilt direction defined by the first alignment film and a pretilt direction defined by the second alignment film are different by about 90° from each other.

In a preferable embodiment, a pretilt angle defined by the first alignment film and a pretilt angle defined by the second alignment film are approximately equal to each other.

In a preferable embodiment, the first alignment film and the second alignment film are each an optical alignment film.

Advantageous Effects of Invention

The present invention can improve the display quality of a VA-mode liquid crystal display device, especially the transmittance thereof. The present invention can also improve the display quality of, especially, a liquid crystal display device having a multi-domain structure formed using an alignment film.

BRIEF DESCRIPTION OF DRAWINGS

FIG. 3(a) shows the pretilt directions on the side of a TFT substrate 1, FIG. 3(b) shows the pretilt directions on the side of a CF substrate 2, and FIG. 3(c) shows the tilt directions and dark lines when a voltage is applied to a liquid crystal layer.

FIG. 4(a) shows the pretilt directions on the side of the TFT substrate 1, FIG. 4(b) shows the pretilt directions on the side of the CF substrate 2, and FIG. 4(c) shows the tilt directions and dark lines when a voltage is applied to the liquid crystal layer.

FIG. 5(a) shows the pretilt directions on the side of the TFT substrate 1, FIG. 5(b) shows the pretilt directions on the side of the CF substrate 2, and FIG. 5(c) shows the tilt directions and dark lines when a voltage is applied to the liquid crystal layer.

FIG. 6(a) shows the pretilt directions on the side of the TFT substrate 1, FIG. 6(b) shows the pretilt directions on the side of the CF substrate 2, and FIG. 6(c) shows the tilt directions and dark lines when a voltage is applied to the liquid crystal layer.

DESCRIPTION OF EMBODIMENTS

Figure 1:
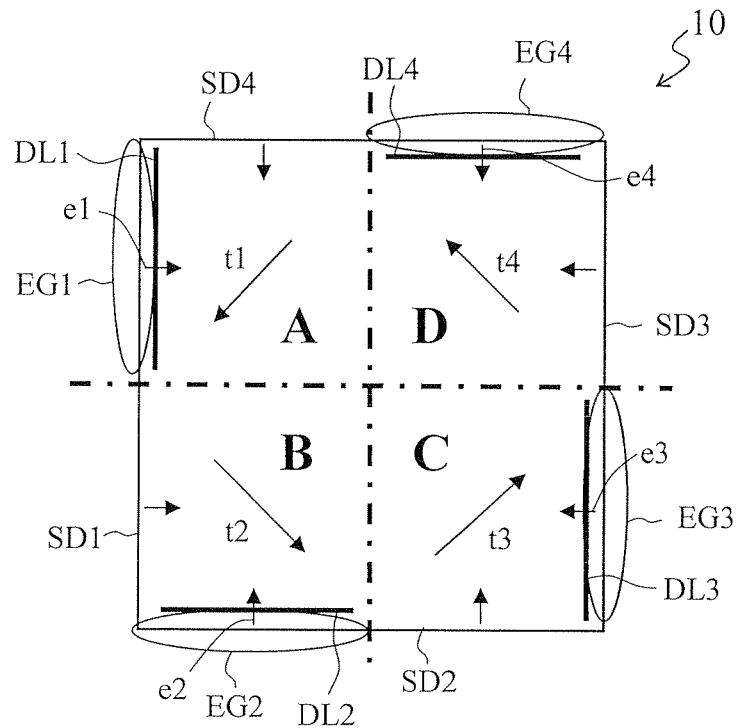
FIG. 1 shows an example of pixel area having a multi-domain structure in a VA-mode liquid crystal display device.

According to the present invention, in a liquid crystal display device including a vertical alignment type liquid crystal layer in which the pretilt direction is defined by alignment films, a rib is provided in an area where a dark line appears. The provision of the rib suppresses the appearance of the dark line and improves the transmittance. As a result of detailed studies, the present inventors found that there are two types of dark lines: a dark line which is sufficiently suppressed by the provision of a rib, and a dark line which is not easily suppressed even by the provision of a rib. According to the present invention, a rib for suppressing the appearance of at least the former type of dark line is provided to effectively improve the transmittance. Hereinafter, embodiments of the present invention will be described. In the following description, a TFT-type liquid crystal display device will be shown as a typical example, but the present invention is applicable to any other driving method of liquid crystal display devices, needless to say.

First, main terms used in this specification will be explained.

In this specification, the term "vertical alignment type liquid crystal layer" refers to a liquid crystal layer in which liquid crystal molecules are aligned at an angle of about 85° or greater with respect to surfaces of the vertical alignment films. The liquid crystal molecules contained in the vertical alignment type liquid crystal layer have a negative dielectric anisotropy. By a combination of the vertical alignment type liquid crystal layer and a pair of polarizing plates facing each other with the liquid crystal layer interposed therebetween and located in crossed Nicols (i.e., located such that transmission axes thereof are generally perpendicular to each other), normally black mode display is provided.

In this specification, the term "pixel" refers to the minimum unit which represents a particular gray scale level in display. In color display, a pixel corresponds to a unit representing, for example, a gray scale level of each of R, G and B, and is also referred to as a "dot". A combination of an R pixel, a G pixel and a B pixel forms one color display pixel. The term "pixel area" refers to an area of the liquid crystal display device which corresponds to the "pixel" for display.

The term "pretilt direction" refers to an alignment direction of a liquid crystal molecule defined by an alignment film and is an azimuthal angle direction in the display plane. An angle of the liquid crystal molecule with respect to the surface of the alignment film when the liquid crystal molecule is aligned in the pretilt direction is referred to as the "pretilt angle". In this specification, performing processing on the alignment film to allow the alignment film to express a capability of defining a prescribed pretilt direction is expressed as "giving a pretilt direction to the alignment film". The pretilt direction defined by the alignment film is occasionally referred to simply as the "pretilt direction of the alignment film". The pretilt direction is given to the alignment film by, for example, rubbing processing or optical alignment processing described later.

By changing the combination of the pretilt directions given by a pair of alignment films facing each other with the liquid crystal layer interposed therebetween, a 4-domain structure can be formed. A pixel area divided into four has four liquid crystal domains.

Each liquid crystal domain is characterized by the tilt direction (also referred to as the "reference alignment direction") of the liquid crystal molecules at the center or in the vicinity thereof in the layer plane and in a thickness direction of the liquid crystal layer when a voltage is applied to the liquid crystal layer. This tilt direction (reference alignment direction) has a dominant influence on the viewing angle dependence of each domain. This tilt direction is also an azimuthal angle direction. The reference based on which the azimuthal angle direction is measured is the horizontal direction of the display plane, and the counterclockwise direction is the forward direction (assuming the display plane is the face of a clock, the 3 o'clock direction is an azimuthal angle of 0° and the counterclockwise direction is the forward direction). Where the tilt directions of the four liquid crystal domains are set such that a difference between any two tilt directions among the four tilt directions is approximately equal to an integral multiple of 90° (e.g., 12 o'clock direction, 9 o'clock direction, 6 o'clock direction and 3 o'clock direction), the viewing angle characteristics are averaged and thus good display can be provided. From the viewpoint of uniformizing the viewing angle characteristics, it is preferable that the area sizes of the four liquid crystal domains in the pixel area are approximately equal to each other. Specifically, it is preferable that a difference between the area size of the largest liquid crystal domain and the area size of the smallest liquid crystal domain among the four liquid crystal domains is 25% or less of the area size of the largest liquid crystal domain.

A vertical alignment type liquid crystal layer shown as an example in the following embodiments contains liquid crystal molecules having a negative dielectric anisotropy (a nematic liquid crystal material having a negative dielectric anisotropy). The pretilt direction defined by one of the alignment films and the pretilt direction defined by the other alignment film are different by 90° from each other. A direction at the middle between these two pretilt directions is defined as the tilt direction (reference alignment direction). No chiral agent is incorporated, and when a voltage is applied to the liquid crystal layer, the liquid crystal molecules in the vicinity of the alignment films are twisted-aligned in accordance with the alignment regulation forces of the alignment films. When necessary, a chiral agent may be incorporated. A VA mode in which the liquid crystal molecules are twisted-aligned by use of a pair of vertical alignment films located such that the pretilt directions (alignment processing directions) thereof are perpendicular to each other is occasionally referred to as the "VATN (Vertical Alignment Twisted Nematic)" mode.

In the VATN mode, it is preferable that the pretilt angles respectively defined by the pair of alignment films are approximately equal to each other. When the pretilt angles are approximately equal to each other, there is an advantage that the display luminance characteristic can be improved. Especially where the difference between the pretilt angles is 1° or less, the tilt direction (reference alignment direction) of the liquid crystal molecules at the center or in the vicinity thereof of the liquid crystal layer can be controlled to be stable and thus the display luminance characteristic can be improved. A conceivable reason for this is that when the difference between the pretilt angles exceeds 1°, the tilt direction is shifted from the prescribed direction, and as a result, an area having a transmittance lower than the desired transmittance is formed.

Known methods for giving a pretilt direction to the alignment film include a method of performing rubbing processing, a method of performing optical alignment processing, a method of forming a minute structure on a layer below the alignment film in advance and reflecting the minute structure on the surface of the alignment film, a method of obliquely vapor-depositing an inorganic substance such as SiO or the like to form an alignment film having a minute structure on a surface thereof, and the like. From the viewpoint of mass productivity, rubbing processing or optical alignment processing is preferable. Especially, the optical alignment processing, which can be performed in a non-contact manner, does not cause static electricity due to friction unlike the rubbing processing and so can improve the yield. Where an optical alignment film containing a photosensitive group is used, the variance in the pretilt angle can be controlled to be 1° or less. It is preferable that the optical alignment film contains, as the photosensitive group, at least one selected from the group consisting of 4-chalcone group, 4'-chalcone group, coumarin group and cinnamoyl group.

Now, a reason why a dark line appears in the vicinity of an edge portion of the electrode will be described.

In a liquid crystal display device including a vertical alignment type liquid crystal layer in which the pretilt directions are defined by the alignment films, when a voltage for displaying an intermediate gray scale level is applied, an area darker than the intermediate gray scale level to be displayed (dark line) may appear in an area inner to an edge portion of the pixel area, generally parallel to the edge portion, as seen from the frontal direction. In the case where the pixel area is divided into domains, when any of edges of the pixel electrode which are close to the liquid crystal domains has such an edge portion that an azimuthal angle direction perpendicular to the edge portion and directed to the inside of the pixel electrode has an angle exceeding 90° with respect to the tilt direction (reference alignment direction) of the corresponding liquid crystal domain, a dark line appears inner to, and parallel to, this edge portion. This is conceived to occur because the tilt direction of the liquid crystal domain and the direction of the alignment regulation force caused by the oblique electric field generated at the edge of the pixel electrode have components facing each other, and so the alignment of the liquid crystal molecules is disturbed in this area.

A pixel area 10 shown in FIG. 1 having a 4-domain structure will be described. The pixel area 10 shown in FIG. 1 is generally square in correspondence to the generally square pixel electrode for simplifying the explanation, but the present invention is not limited to such a shape of the pixel area. The pixel area 10 may be generally rectangular.

The pixel area 10 includes four liquid crystal domains A, B, C and D. The tilt directions (reference alignment directions) of the liquid crystal domains A, B, C and D are respectively represented as t1, t2, t3 and t4. A difference between any two among these four directions is approximately equal to an integral multiple of 90°. In FIG. 1, the liquid crystal domains A, B, C and D have an equal area size to each other. The example shown in FIG. 1 is the most preferable 4-domain structure from the viewpoint of the viewing angle characteristics. The four liquid crystal domains A, B, C and D are located in a matrix of 2 rows×2 columns.

The pixel electrode has four edges (sides) SD1, SD2, SD3 and SD4. The oblique electric fields generated when a voltage is applied each exhibit an alignment regulation force having a component of a direction (azimuthal angle direction) perpendicular to the respective side and directed to the inside of the pixel electrode. In FIG. 1, the azimuthal angle directions respectively perpendicular to the four edges SD1, SD2, SD3 and SD4 and directed to the inside of the pixel electrode are represented by arrows e1, e2, e3 and e4.

Each of the four liquid crystal domains A, B, C and D is close to two among the four edges SD1, SD2, SD3 and SD4 of the pixel electrode, and in the presence of a voltage, receives alignment regulation forces caused by the oblique electric fields generated along the respective edges.

Regarding an edge portion EG1 at one of the edges of the pixel electrode close to the liquid crystal domain A, the azimuthal angle direction e1 perpendicular to the edge portion EG1 and directed to the inside of the pixel electrode makes an angle exceeding 90° with respect to the tilt direction t1 of the liquid crystal domain A. Therefore, alignment disturbance occurs. As a result, in the liquid crystal domain A, a dark line DL1 appears parallel to the edge portion EG1 when a voltage is applied. A pair of polarizing plates facing each other with the liquid crystal layer interposed therebetween are located such that transmission axes (polarization axes) thereof are perpendicular to each other. More specifically, the polarizing plates are located such that one of the transmission axes is parallel to the horizontal direction of the display plane, and the other transmission axis is parallel to the vertical direction to the display plane. Hereinafter, unless otherwise specified, the polarization axes of polarizing plates are located in this manner.

Similarly, regarding an edge portion EG2 at one of the edges of the pixel electrode close to the liquid crystal domain B, the azimuthal angle direction e2 perpendicular to the edge portion EG2 and directed to the inside of the pixel electrode makes an angle exceeding 90° with respect to the tilt direction t2 of the liquid crystal domain B. Therefore, alignment disturbance occurs. As a result, in the liquid crystal domain B, a dark line DL2 appears parallel to the edge portion EG2 when a voltage is applied.

Similarly, regarding an edge portion EG3 at one of the edges of the pixel electrode close to the liquid crystal domain C, the azimuthal angle direction e3 perpendicular to the edge portion EG3 and directed to the inside of the pixel electrode makes an angle exceeding 90° with respect to the tilt direction t3 of the liquid crystal domain C. Therefore, alignment disturbance occurs. As a result, in the liquid crystal domain C, a dark line DL3 appears parallel to the edge portion EG3 when a voltage is applied.

Similarly, regarding an edge portion EG4 at one of the edges of the pixel electrode close to the liquid crystal domain D, the azimuthal angle direction e4 perpendicular to the edge portion EG4 and directed to the inside of the pixel electrode makes an angle exceeding 90° with respect to the tilt direction t4 of the liquid crystal domain D. Therefore, alignment disturbance occurs. As a result, in the liquid crystal domain D, a dark line DL4 appears parallel to the edge portion EG4 when a voltage is applied.

Where the azimuthal angle of the horizontal direction of the display plane (3 o'clock direction) is 0°, the tilt direction t1 of the liquid crystal domain A is a direction of about 225°, the tilt direction t2 of the liquid crystal domain B is a direction of about 315°, the tilt direction t3 of the liquid crystal domain C is a direction of about 45°, and tilt direction t4 of the liquid crystal domain D is a direction of about 135°. Namely, the liquid crystal domains A, B, C and D are located such that the tilt directions thereof are different by about 90° between adjacent domains among the liquid crystal domains A through D. The angles made between the tilt directions t1, t2, t3 and t4 of the liquid crystal domains A, B, C and D and the azimuthal angle components e1, e2, e3 and e4 of the alignment regulation forces caused by the oblique electric fields generated in the edge portions EG1, EG2, EG3 and EG4 close to the liquid crystal domains A, B, C and D, respectively, are all about 135°.

Figure 2:
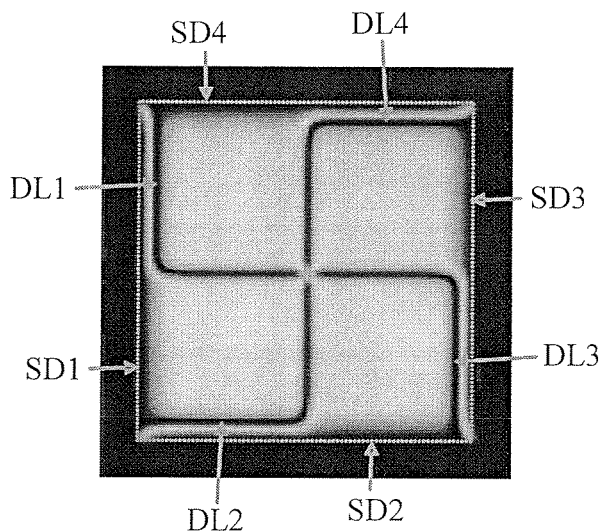
FIG. 2 shows the transmittance of the pixel area shown in FIG. 1 in the presence of a voltage, found by simulations.

The dark lines DL1, DL2, DL3 and DL4 appearing in the pixel area 10 parallel to the edge portions EG1, EG2, EG3 and EG4 respectively as described above lower the transmittance. FIG. 2 shows the transmittance of the pixel area 10 in the presence of a voltage found by simulations. It is understood from FIG. 2 that the dark lines DL1, DL2, DL3 and DL4 appear in the liquid crystal domains A, B, C and D and thus lower the transmittance.

Now, with reference to FIG. 3, a method for dividing a pixel area to form domains will be described. FIGS. 3(a), (b) and (c) illustrate a method for dividing the pixel area 10 shown in FIG. 1. FIG. 3(a) shows pretilt directions PA1 and PA2 of an alignment film provided on a TFT substrate (lower substrate), and FIG. 3(b) shows pretilt directions PB1 and PB2 of an alignment film provided on a color filter (CF) substrate (upper substrate). FIG. 3(c) shows the tilt directions and the dark lines DL1 through DL4 when a voltage is applied to the liquid crystal layer. These figures schematically show the alignment directions of the liquid crystal molecules as seen from the observer. A liquid crystal molecule is tilted such that an end (elliptical area) of the liquid crystal molecule shown as having a cylindrical shape is closer to the observer.

As shown in FIG. 3(a), an area on the TFT substrate side (area corresponding to one pixel area 10) is divided into two, namely, a left area and a right area, and the vertical alignment film is alignment-processed such that the pretilt directions PA1 and PA2 antiparallel to each other are given to the respective areas (left area and right area) of the vertical alignment film. In this example, optical alignment processing is performed by ultraviolet rays directed obliquely in the direction represented by the arrow.

As shown in FIG. 3(b), an area on the CF substrate side (area corresponding to one pixel area 10) is divided into two, namely, a top area and a bottom area, and the vertical alignment film is alignment-processed such that the pretilt directions PB1 and PB2 antiparallel to each other are given to the respective areas (top area and bottom area) of the vertical alignment film. In this example, optical alignment processing is performed by ultraviolet rays directed obliquely in the direction represented by the arrow.

By bringing together the TFT substrate and the CF substrate alignment-processed as shown in FIGS. 3(a) and (b), the pixel area 10 divided to have domains as shown in FIG. 3(c) can be formed. As can be seen from FIG. 3(c), in each of the liquid crystal domains A, B, C and D, the pretilt direction of the alignment film on the TFT substrate and the pretilt direction of the alignment film on the CF substrate are different by 90° from each other, and a direction at the middle of these two pretilt directions is defined as the tilt direction (reference alignment direction).

As described above with reference to FIG. 1, the dark line DL1 appears in the liquid crystal domain A parallel to the edge portion EG1, and the dark line DL2 appears in the liquid crystal domain B parallel to the edge portion EG2. The dark line DL3 appears in the liquid crystal domain C parallel to the edge portion EG3, and the dark line DL4 appears in the liquid crystal domain D parallel to the edge portion EG4. The dark line DL1 and the dark line DL3 are generally parallel to the vertical direction of the display plane, and the dark line DL2 and the dark line DL4 are generally parallel to the horizontal direction of the display plane. Namely, the edge portion EG1 and the edge portion EG3 are generally parallel to the vertical direction of the display plane, and the edge portion EG2 and the edge portion EG4 are generally parallel to the horizontal direction of the display plane.

Figure 3:
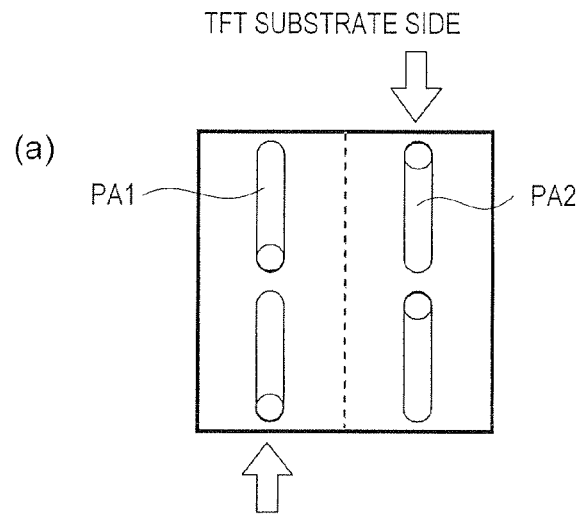
FIG. 3 shows a method for dividing the pixel area shown in FIG. 1.
Figure 3:
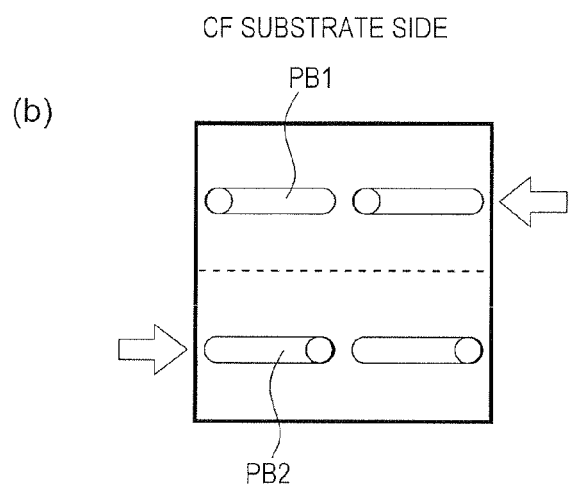
Figure 3:
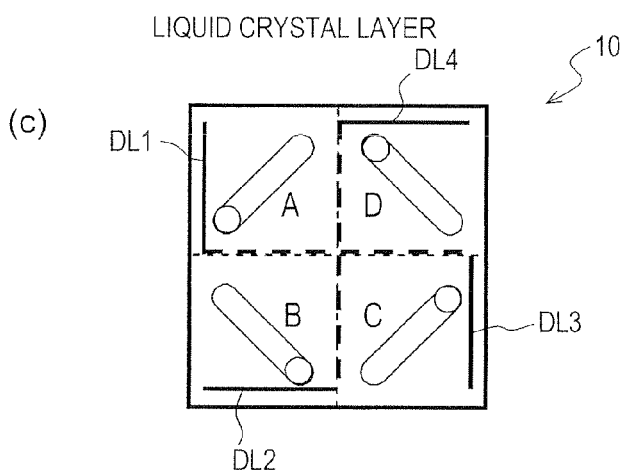

The method for dividing one pixel into four liquid crystal domains A through D (locations of the liquid crystal domains A through D in the pixel area) is not limited to the example shown in FIG. 3.

Figure 4:
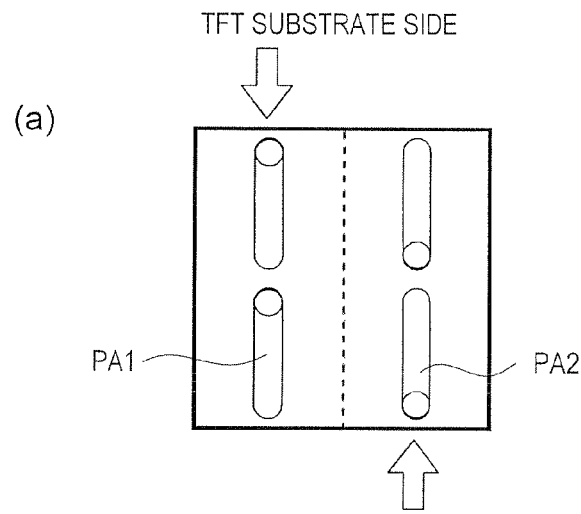
FIG. 4 shows another example of method for dividing the pixel area.
Figure 4:
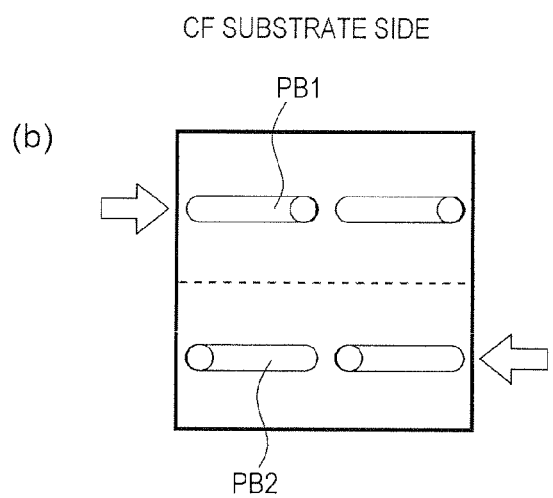
Figure 4:
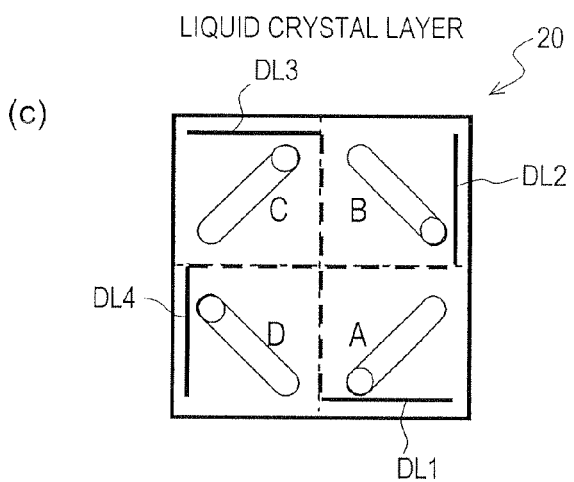

For example, by bringing together the TFT substrate and the CF substrate alignment-processed as shown in FIGS. 4(a) and (b), a pixel area 20 divided to have domains as shown in FIG. 4(c) can be formed. Like the pixel area 10, the pixel area 20 includes four liquid crystal domains A through D. The tilt directions of the liquid crystal domains A through D are the same as those of the liquid crystal domains A through D in the pixel area 10.

It should be noted that in the pixel area 10, the liquid crystal domains A through D are located in the order of top left, bottom left, bottom right and top right (i.e., counterclockwise from top left); whereas in the pixel area 20, the liquid crystal domains A through D are located in the order of bottom right, top right, top left and bottom left (i.e., counterclockwise from bottom right). A reason for this is that the pretilt directions of the left area and the right area on the TFT substrate side are opposite, and the pretilt directions of the top area and the bottom area on the CF substrate side are opposite, between the pixel area 10 and the pixel area 20. The dark lines DL1 and DL3 appearing in the liquid crystal domains A and C are generally parallel to the horizontal direction of the display plane, and the dark lines DL2 and DL4 appearing in the liquid crystal domains B and C are generally parallel to the vertical direction of the display plane. Namely, the edge portions EG1 and EG3 are generally parallel to the horizontal direction of the display plane, and the edge portions EG2 and EG4 are generally parallel to the vertical direction of the display plane.

Figure 5:
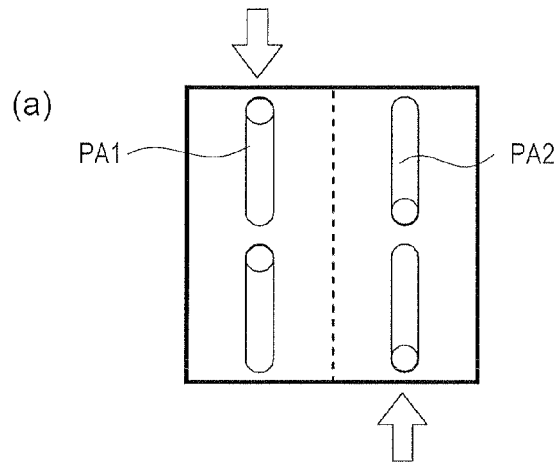
FIG. 5 shows still another example of method for dividing the pixel area.
Figure 5:
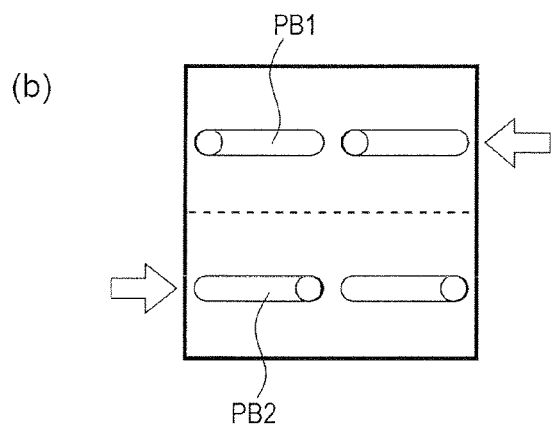
Figure 5:
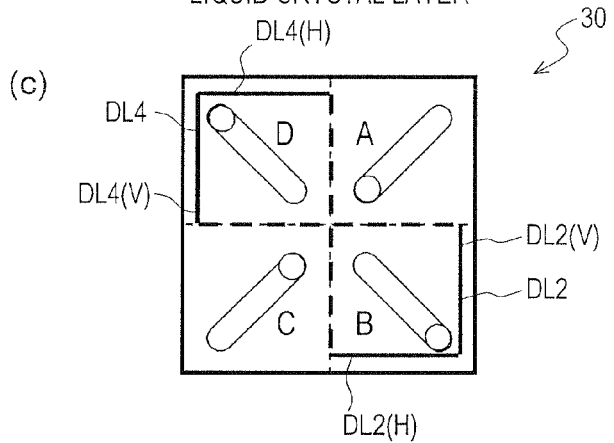

By bringing together the TFT substrate and the CF substrate alignment-processed as shown in FIGS. 5(a) and (b), a pixel area 30 divided to have domains as shown in FIG. 5(c) can be formed. Like the pixel area 10, the pixel area 30 includes four liquid crystal domains A through D. The tilt directions of the liquid crystal domains A through D are the same as those of the liquid crystal domains A through D in the pixel area 10.

It should be noted that in the pixel area 30, the liquid crystal domains A through D are located in the order of top right, bottom right, bottom left and top left (i.e., clockwise from top right). A reason for this is that the pretilt directions of the left area and the right area on the TFT substrate side are opposite between the pixel area 10 and the pixel area 30.

In the pixel area 30, no dark line appears in the liquid crystal domains A and C. A reason for this is that any of the edges of the pixel electrode close to the liquid crystal domains A and C does not have such an edge portion that the azimuthal angle direction perpendicular to the edge portion and directed to the inside of the pixel electrode has an angle exceeding 90° with respect to the corresponding tilt direction. By contrast, the dark lines DL2 and DL4 appear in the liquid crystal domains B and D. A reason for this is that each of the edges of the pixel electrode close to the liquid crystal domains B and D has such an edge portion that the azimuthal angle direction perpendicular to the edge portion and directed to the inside of the pixel electrode has an angle exceeding 90° with respect to the corresponding tilt direction. The dark lines DL2 and DL4 respectively include portions DL2(H) and DL4(H) parallel to the horizontal direction and portions DL2(V) and DL4(V) parallel to the vertical direction. A reason for this is that the tilt direction of each of the liquid crystal domains B and D has an angle exceeding 90° with respect to both of an azimuthal angle direction perpendicular to the horizontal edge and directed to the inside of the pixel electrode and an azimuthal angle direction perpendicular to the vertical edge and directed to the inside of the pixel electrode.

Figure 6:
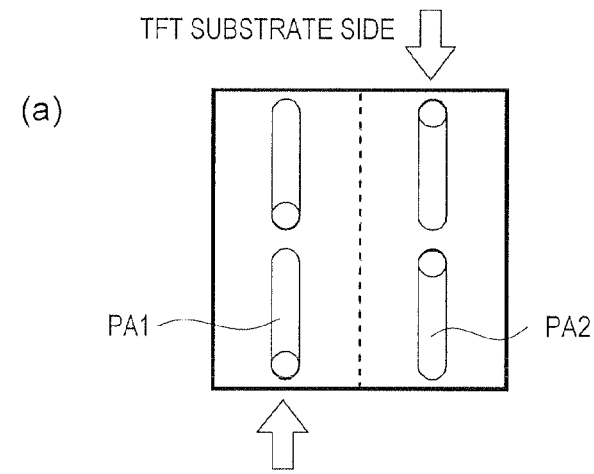
FIG. 6 shows still another example of method for dividing the pixel area.
Figure 6:
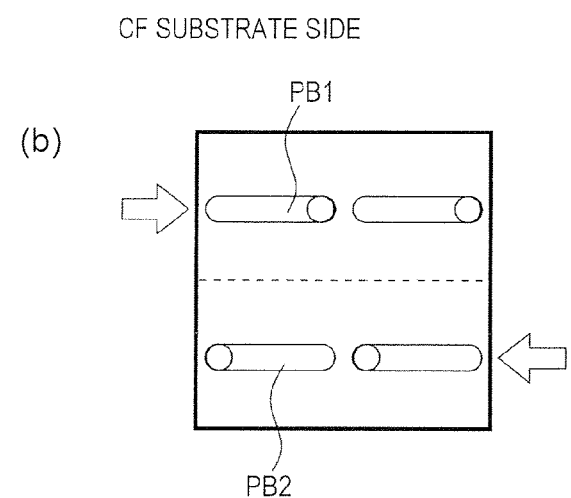
Figure 6:
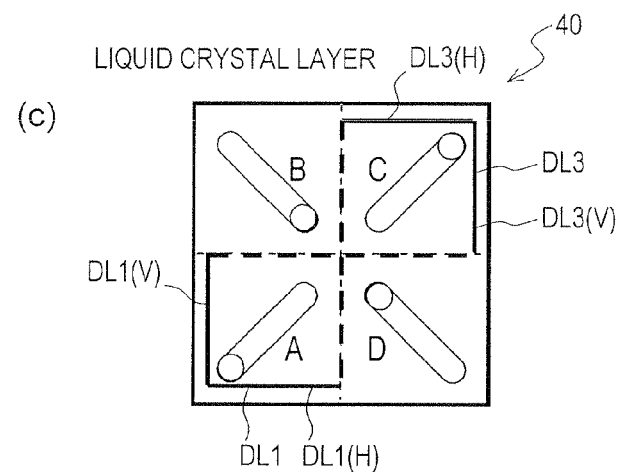

By bringing together the TFT substrate and the CF substrate alignment-processed as shown in FIGS. 6(a) and (b), a pixel area 40 divided to have domains as shown in FIG. 6(c) can be formed. Like the pixel area 10, the pixel area 40 includes four liquid crystal domains A through D. The tilt directions of the liquid crystal domains A through D are the same as those of the liquid crystal domains A through D in the pixel area 10.

It should be noted that in the pixel area 40, the liquid crystal domains A through D are located in the order of bottom left, top left, top right and bottom right (i.e., clockwise from bottom left). A reason for this is that the pretilt directions of the top area and the bottom area on the CF substrate side are opposite between the pixel area 10 and the pixel area 40.

In the pixel area 40, no dark line appears in the liquid crystal domains B and D. A reason for this is that any of the edges of the pixel electrode close to the liquid crystal domains B and D does not have such an edge portion that the azimuthal angle direction perpendicular to the edge portion and directed to the inside of the pixel electrode has an angle exceeding 90° with respect to the corresponding tilt direction. By contrast, the dark lines DL1 and DL3 appear in the liquid crystal domains A and C. A reason for this is that each of the edges of the pixel electrode close to the liquid crystal domains A and C has such an edge portion that the azimuthal angle direction perpendicular to the edge portion and directed to the inside of the pixel electrode has an angle exceeding 90° with respect to the corresponding tilt direction. The dark lines DL1 and DL3 respectively include portions DL1(H) and DL3(H) parallel to the horizontal direction and portions DL1(V) and DL3(V) parallel to the vertical direction. A reason for this is that the tilt direction of each of the liquid crystal domains A and C has an angle exceeding 90° with respect to both of an azimuthal angle direction perpendicular to the horizontal edge and directed to the inside of the pixel electrode and an azimuthal angle direction perpendicular to the vertical edge and directed to the inside of the pixel electrode.

Figure 7:
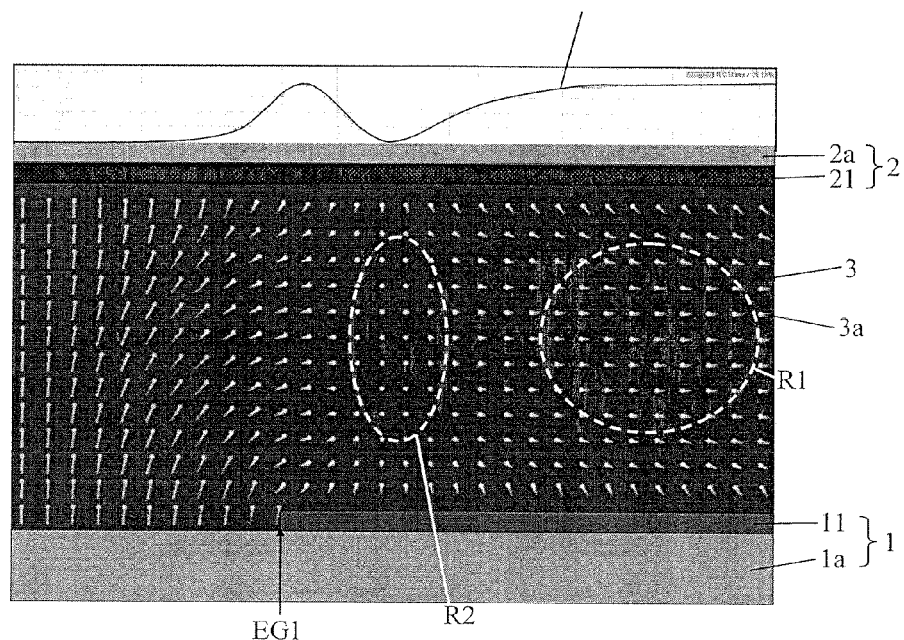
FIG. 7 is a cross-sectional view showing a part of a pixel area of a VA-mode liquid crystal display device, and shows the alignment directions of liquid crystal molecules and the relative transmittance (frontal direction) which were found by simulations.

FIG. 7 is a cross-sectional view showing a part of a pixel area, and shows the alignment directions of the liquid crystal molecules and the relative transmittance (frontal direction) which were found by simulations. FIG. 7 shows, as elements of a liquid crystal display device, a TFT substrate 1 including a transparent plate (e.g., glass plate) 1a and a pixel electrode 11 formed on the transparent plate 1a, a CF substrate 2 including a transparent plate (e.g., glass plate) 2a and a counter electrode 2a formed on the transparent plate 2a, a vertical alignment type liquid crystal layer 3 provided between the TFT substrate 1 and the CF substrate 2, and liquid crystal molecules 3a contained in the liquid crystal layer 3.

FIG. 7 corresponds for example, a cross-sectional view of the left half of the liquid crystal domain A shown in FIG. 3(c) taken along a line having an azimuthal angle of 0°. On surfaces of the TFT substrate 1 and the CF substrate 2 on the liquid crystal layer 3 side, a pair of vertical alignment films (not shown) are provided. The pair of vertical alignment films are respectively alignment-processed as shown in FIGS. 3(a) and (b). Therefore, as in an area R1 enclosed by the dashed line in FIG. 7, the liquid crystal molecules 3a at the center and in vicinity thereof of the liquid crystal domain A (at the center and in vicinity thereof in the layer plane and in the thickness direction) obliquely fall such that a lower end thereof is right and away from the observer of the figure and an upper end thereof is left and directed toward the observer of the figure. The tilt direction thereof is an azimuthal angle of about 225°.

Regarding the edge portion EG1 of the pixel electrode 11 shown in FIG. 7, it is seen that a liquid crystal molecules 3a, which should be tilted at a direction of 135°, are twisted as being closer to the edge portion EG1 of the pixel electrode 11 by the influence of the alignment regulation force (acting so as to cause the liquid crystal molecules 3a to fall in the azimuthal angle direction of 0°) caused by the oblique electric field generated in the edge portion EG1. In this example, the twisting angle is 135°, which exceeds 90°. Therefore, due to a change of the retardation of the liquid crystal layer 3 in this twist area, the relative transmittance is changed in a complicated manner as shown in this figure, and a portion having the minimum relative transmittance is formed in the pixel area 10 (inner to the edge of the pixel electrode 11). This portion is in an area R2 enclosed by the dashed line in FIG. 7, and corresponds to the dark line DL1 in the liquid crystal domain A in FIG. 3(c).

Figure 8:
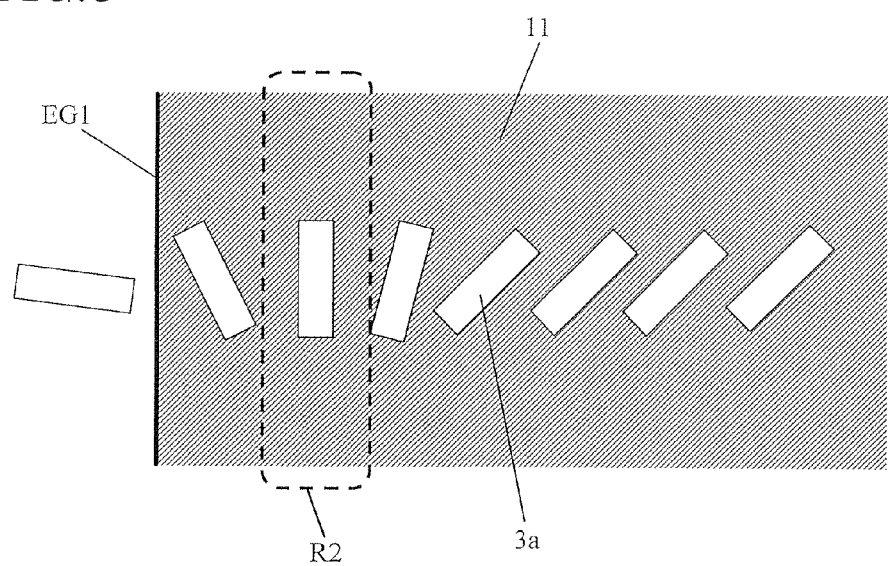
FIG. 8 is a plan view of the area shown in FIG. 7, which schematically shows the alignment of the liquid crystal molecules at the center and in the vicinity thereof in a thickness direction of a liquid crystal layer.

FIG. 8 is a top view of the area shown in FIG. 7, schematically showing the alignment of the liquid crystal molecules 3a at the center and in the vicinity thereof in the thickness direction of the liquid crystal layer 3. As can be seen from FIG. 8, at the center and in the vicinity thereof of the liquid crystal domain A, the liquid crystal molecules 3a fall in the desired tilt direction, namely, in a direction of about 135°. By contrast, on the edge portion EG1 of the pixel electrode 11, the liquid crystal molecule 3a falls in a direction perpendicular to the edge portion EG1 and directed to the center of the pixel area 10, namely, in a direction of about 0°, by the alignment regulation force of the oblique electric field. Accordingly, the liquid crystal molecules 3a located between these areas fall such that the change of the alignment direction of the liquid crystal molecules 3a is continuous between the center and the vicinity thereof of the liquid crystal domain A and the edge portion EG1 of the pixel electrode 11. As a result, as shown in FIG. 8, there is a liquid crystal molecule 3a falling in a direction of about 270° (toward the observer of FIG. 7) inner to the edge portion EG1. Such an alignment direction of the liquid crystal molecules 3a is parallel to, or perpendicular to, the transmission axes of the pair of polarizing plates. Therefore, the area in which the liquid crystal molecules 3a are aligned in this manner (area R2 enclosed by the dashed line in FIG. 8) does not give any retardation to light passing the liquid crystal layer 3 almost at all, namely, appears as the dark line DL1.

In the above, a condition under which the dark line appears is described as that the azimuthal angle direction perpendicular to the edge portion of the pixel electrode and directed to the inside of the pixel electrode has an angle exceeding 90° with respect to the tilt direction (reference alignment direction) of the corresponding liquid crystal domain. More precisely, there are two conditions under which a dark line appears. Namely, there are two types of dark lines which appear under different conditions. The "first type" of dark line appears in the vicinity of such an edge portion that the azimuthal angle component of the alignment regulation force caused by the oblique electric field generated in the vicinity of the edge portion and the azimuthal angle component of the alignment regulation force caused by the alignment film on the CF substrate are opposite to each other. By contrast, the "second type" of dark line appears in the vicinity of such an edge portion that the azimuthal angle component of the alignment regulation force caused by the oblique electric field generated in the vicinity of the edge portion and the azimuthal angle component of the alignment regulation force caused by the alignment film on the TFT substrate are opposite to each other.

For example, in the pixel area 10 shown in FIG. 3(c), the dark lines DL1 and DL3 are the first type of dark lines, and the dark lines DL2 and DL4 are the second type of dark lines. In the pixel area 20 shown in FIG. 4(c), the dark lines DL2 and DL4 are the first type of dark lines, and the dark lines DL1 and DL3 are the second type of dark lines. In the pixel area 30 shown in FIG. 5(c), the portions DL2(V) and DL4(V), parallel to the vertical direction, of the dark lines DL2 and DL4 are the first type of dark lines, and the portions DL2(H) and DL4(H), parallel to the horizontal direction, of the dark lines DL2 and DL4 are the second type of dark lines. In the pixel area 40 shown in FIG. 6(c), the portions DL1(V) and DL3(V), parallel to the vertical direction, of the dark lines DL1 and DL3 are the first type of dark lines, and the portions DL1(H) and DL1(H), parallel to the horizontal direction, of the dark lines DL1 and DL1 are the second type of dark lines.

Figure 9:
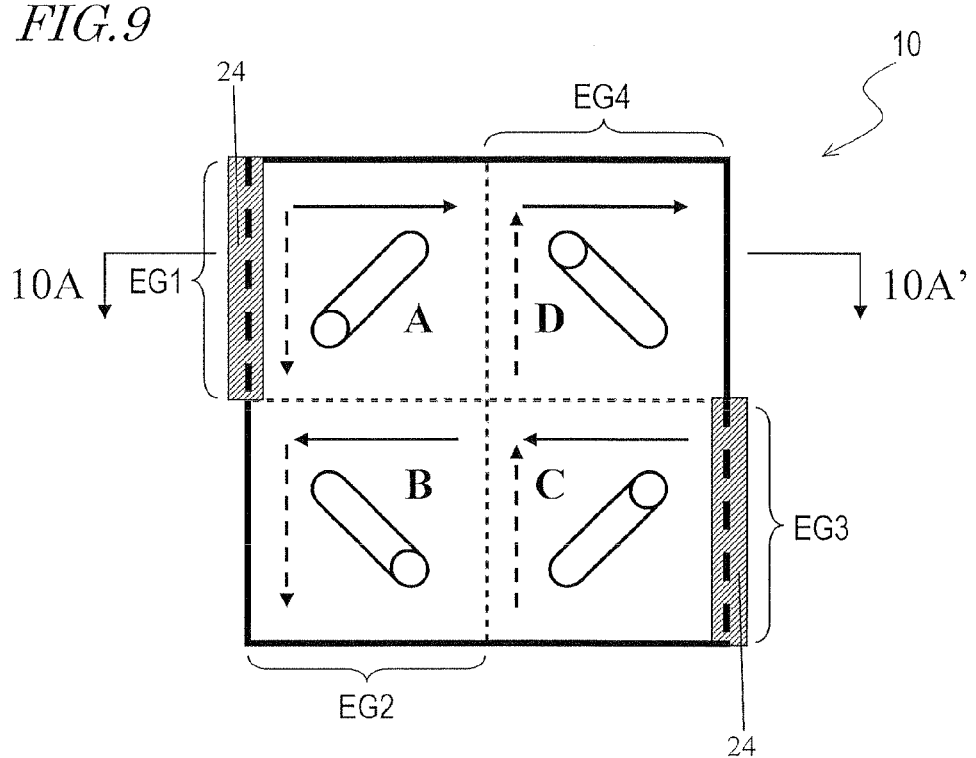
FIG. 9 is a plan view schematically showing one pixel area of a liquid crystal display device in a preferable embodiment according to the present invention.

Now, with reference to FIG. 9 and FIG. 10, a specific structure of a liquid crystal display device 100 in this embodiment will be described. FIG. 9 is a plan view schematically showing one pixel area 10 of the liquid crystal display device 100, and FIG. 10 is a cross-sectional view taken along line 10A-10A' in FIG. 9.

Figure 10:
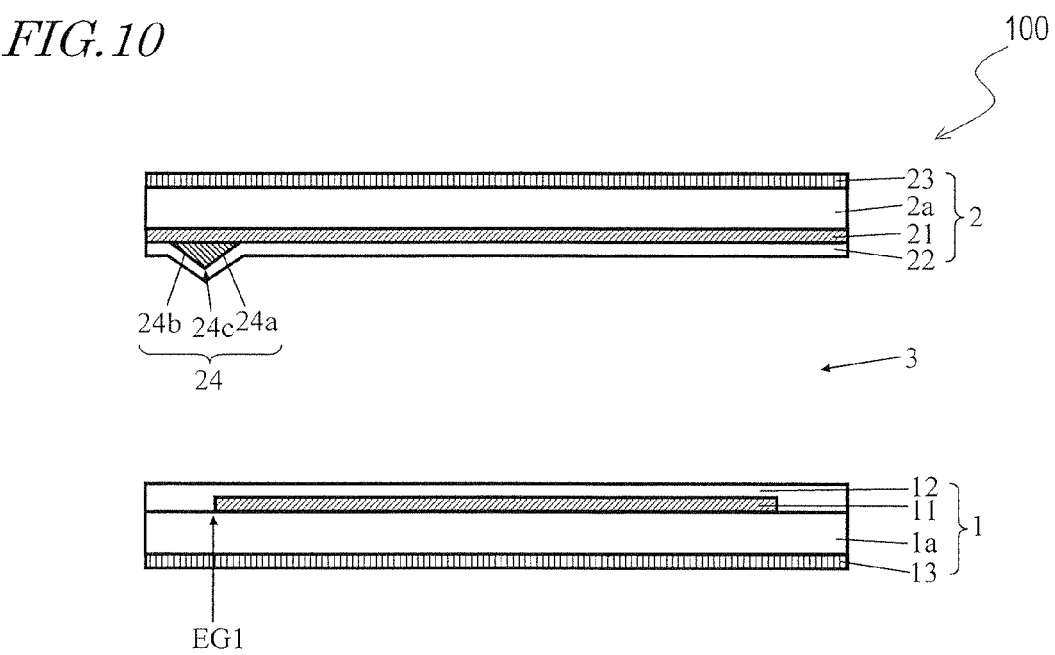
FIG. 10 schematically shows the liquid crystal display device in the preferable embodiment according to the present invention and is a cross-sectional view taken along line 10A-10A' in FIG. 9.

As shown in FIG. 10, the liquid crystal display device 100 includes a vertical alignment type liquid crystal layer 3, and a TFT substrate (also referred to as the "active matrix substrate" occasionally) 1 and a CF substrate (also referred to as the "counter substrate" occasionally) 2 facing each other with the liquid crystal layer 3 interposed therebetween, a pixel electrode 11 included in the TFT substrate 1 on the liquid crystal layer 3 side, and a counter electrode 21 included in the CF substrate 2 on the liquid crystal layer 3 side.

The liquid crystal layer 3 contains liquid crystal molecules having a negative dielectric anisotropy. The pixel electrode 11 is provided on a transparent plate (e.g., glass plate) 1a, and the counter electrode 21 is provided on a transparent plate (e.g., glass plate) 2a.

A first alignment film 12 is provided between the pixel electrode 11 and the liquid crystal layer 3, and a second alignment film 22 is provided between the counter electrode 21 and the liquid crystal layer 3. A pair of polarizing plates 13 and 23 are provided so as to face each other with the liquid crystal layer 3 interposed therebetween. The pair of polarizing plates 13 and 23 are located such that transmission axes (polarization axes) thereof are generally perpendicular to each other.

The liquid crystal display device 100 includes a plurality of pixel areas 10 located in a matrix. As shown in FIG. 9, each pixel area 10 is divided into domains like the pixel area 10 shown in FIG. 3(c). Namely, the pixel area 10 includes four liquid crystal domains A through D respectively having tilt directions of about 225°, about 315°, about 45° and about 135° when a voltage is applied between the pixel electrode 11 and the counter electrode 21. The transmission axis of one of the pair of polarizing plates 13 and 23 is generally parallel to the horizontal direction of the display plane, and the transmission axis of the other polarizing plate is generally parallel to the vertical direction of the display plane. Accordingly, the tilt directions of the liquid crystal domains A through D each have an angle of about 45° with respect to the transmission axes of the polarizing plates 13 and 23.

In FIG. 9, in areas corresponding to the liquid crystal domains A through D, the pretilt directions of the first alignment film 12 are represented by the dashed line arrows, and the pretilt directions of the second alignment film 22 are represented by the solid line arrows. These arrows representing the pretilt directions show that the liquid crystal molecules are pretilted such that the end on the arrow tip side is farther from the substrate (substrate on which the respective alignment film is provided) than the end on the opposite side. In the area corresponding to each of the liquid crystal domains A through D, the pretilt direction of the first alignment film 12 and the pretilt direction of the second alignment film 22 are different by about 90° from each other. It is preferable that the pretilt angle defined by the first alignment film 12 and the pretilt angle defined by the second alignment film 22 are approximately equal to each other as described above.

In the liquid crystal display device 100 in this embodiment, as shown in FIG. 9 and FIG. 10, the CF substrate 2 includes ribs 24 (protrusions) provided in areas corresponding to the edge portions EG1 and EG3. As shown in FIG. 10, each rib 24 includes two side faces 24a and 24b inclining with respect to the surface of the plate 2a and an apex (ridgeline) 24c defined between the side faces 24a and 24b, and extends generally parallel to the edge portions EG1 and EG3. Hereinafter, the side face 24a located at a relatively inner position will be also referred to as the "inner side face", and the side face 24b located at a relatively outer position will be also referred to as the "outer side face".

The rib 24 exhibits an alignment regulation force of aligning the liquid crystal molecules generally vertically to the side surfaces 24a and 24b, namely, an alignment regulation force of causing the liquid crystal molecules to fall in a direction generally perpendicular to the direction in which the rib 24 extends. For example, the inner side face 24a of the rib 24 shown in FIG. 10 (rib provided in an area corresponding to the edge portion EG1) acts to cause the liquid crystal molecules in the vicinity thereof to fall counterclockwise in FIG. 10, and the outer side face 24b acts to cause the liquid crystal molecules in the vicinity thereof to fall clockwise in FIG. 10.

As described above with reference to FIG. 1, according to the multi-domain structure in the pixel area 10, the tilt direction of the liquid crystal domain A has an angle exceeding 90° with respect to the azimuthal angle direction perpendicular to the edge portion EG1 and directed to the inside of the pixel electrode 11 (direction e1 in FIG. 1). The tilt direction of the liquid crystal domain C has an angle exceeding 90° with respect to the azimuthal angle direction perpendicular to the edge portion EG3 and directed to the inside of the pixel electrode 11 (direction e3 in FIG. 1). Therefore, in the vicinity of the edge portions EG1 and EG3, the dark line would appear if no measure was taken.

The azimuthal angle component of the alignment regulation force caused by the oblique electric field generated in the vicinity of the edge portion EG1 (direction e1 in FIG. 1) and the azimuthal angle component of the alignment regulation force caused by the second alignment film 22 in the area corresponding to the liquid crystal domain A are opposite to each other. It should be noted that the azimuthal angle component of the alignment regulation force caused by the second alignment film 22 can be represented by an arrow opposite to the pretilt directions of the second alignment film 22 represented by the solid line arrows in FIG. 9 (by contrast, the azimuthal angle component of the alignment regulation force caused by the first alignment film 12 can be represented by an arrow in the same direction as the pretilt directions of the first alignment film 12 represented by the dashed line arrows in FIG. 9). Accordingly, as long as the azimuthal angle direction perpendicular to the edge portion and directed to the inside of the pixel electrode 11 and the pretilt direction of the second alignment film 22 are the same as each other, it can be considered that the azimuthal angle component of the alignment regulation force caused by the oblique electric field and the azimuthal angle component of the alignment regulation force caused by the second alignment film 22 are opposite to each other. Like in the vicinity of the edge portion EG1, the azimuthal angle component of the alignment regulation force caused by the oblique electric field generated in the vicinity of the edge portion EG3 (direction e3 in FIG. 1) and the azimuthal angle component of the alignment regulation force caused by the second alignment film 22 in the area corresponding to the liquid crystal domain C are opposite to each other. Therefore, in the vicinity of the edge portions EG1 and EG3, the first type of dark line would appear if no measure was taken.

In the liquid crystal display device 100 in this embodiment, the CF substrate 2 includes the ribs 24 in areas in which the first type of dark line would appear if no measure was taken. The alignment regulation force of the inner side face 24a of the rib 24 has an azimuthal angle component in the same direction as the azimuthal angle component of the alignment regulation force caused by the second alignment film 22. Namely, the inner side face 24a of the rib 24 exhibits an alignment regulation force matching the alignment regulation force caused by the second alignment film 22. Therefore, in the liquid crystal display device 100 in this embodiment, in the areas in which the first type of dark line would appear if no measure was taken, the alignment regulation force exerted on the liquid crystal layer 3 from the CF substrate 2 side can be strengthened. Hence, the appearance of the dark line (first type of dark line) can be suppressed.

Figure 11:
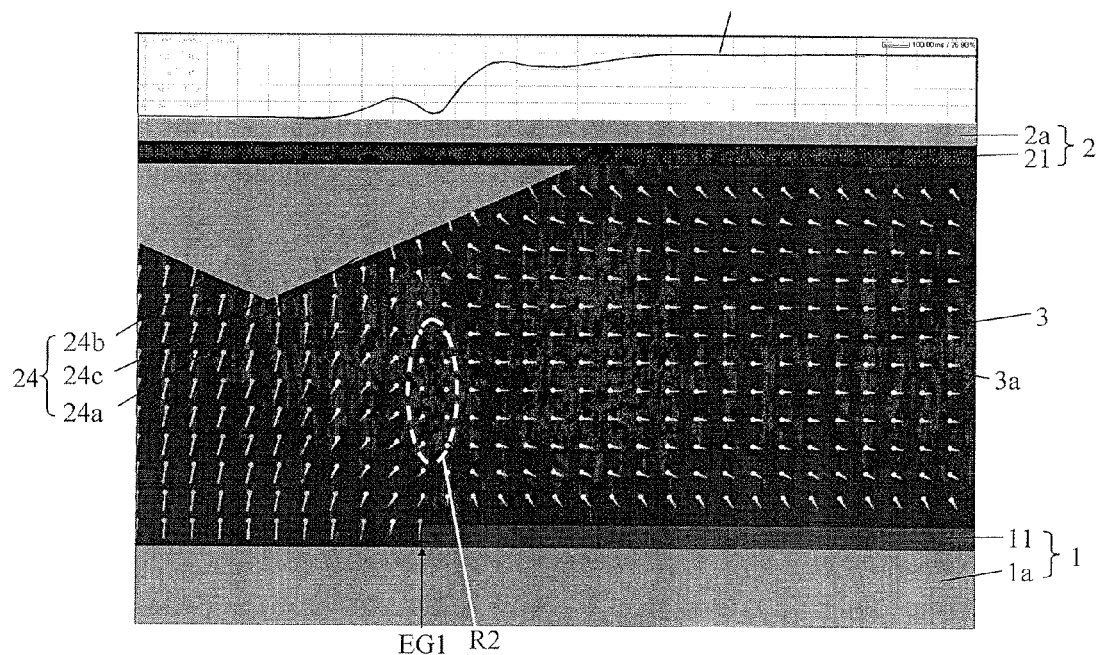
FIG. 11 is a cross-sectional view showing a part of a pixel area of a liquid crystal display device in a preferable embodiment according to the present invention, and shows alignment directions of liquid crystal molecules and the relative transmittance (frontal direction) which were found by simulations.

FIG. 11 shows the alignment directions of the liquid crystal molecules 3a and the relative transmittance (frontal direction) which were found by simulations performed on the pixel area 10 in the liquid crystal display device 100. FIG. 11 corresponds to a cross-sectional view of the left half of the liquid crystal domain A taken along a line having an azimuthal angle of 0°.

As can be seen from FIG. 11, in the case where the CF substrate 2 includes a rib 24, as compared with the case where the CF substrate 2 includes no rib 24 (see FIG. 7), the area R2 in which the liquid crystal molecules 3a fall toward the observer of the figure in the vicinity of the edge portion EG1 (i.e., the liquid crystal molecules 3a are aligned in a direction parallel to, or perpendicular to, the transmission axis) is moved outward and is located approximately on the edge portion EG1. In addition, the width of such an area R2 is narrow. Accordingly, in a curve representing the relative transmittance (top of FIG. 11), a portion representing the minimum value is moved outward as compared with in FIG. 7, and the width of a portion in which the relative transmittance is dropped (lowered) is narrow. As described above, in the liquid crystal display device 100, the dark line is expelled outward and narrowed. Thus, the appearance of the dark line in the pixel area 10 is substantially prevented. Therefore, the transmittance is improved and so the display quality is improved.

Figure 12:
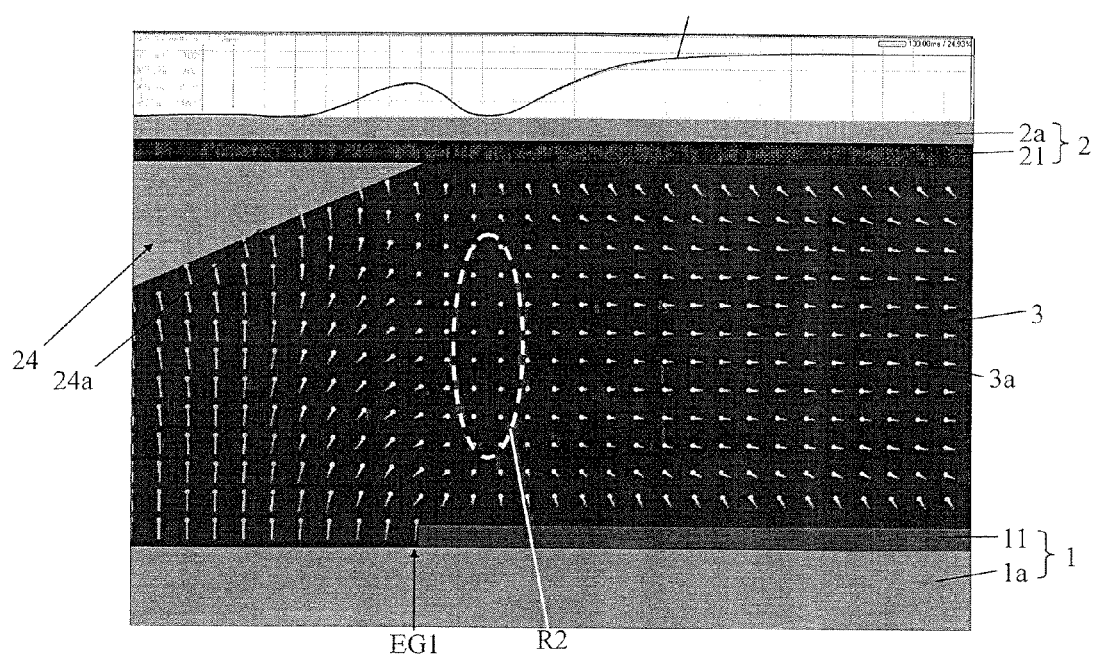
FIG. 12 is a cross-sectional view showing a part of a pixel area of a liquid crystal display device in a preferable embodiment according to the present invention, and shows alignment directions of liquid crystal molecules and the relative transmittance (frontal direction) which were found by simulations.

As described above, the rib 24 provides an effect of suppressing the appearance of the dark line owing to the alignment regulation force of the inner side face 24a. Therefore, it is preferable that the rib 24 is located such that at least a part of the inner side face 24a overlaps the pixel electrode 11 in order to sufficiently exert the alignment regulation force of the inner side face 24a on the liquid crystal molecules in the vicinity of the edge portion. FIG. 12 shows the alignment directions of the liquid crystal molecules 3a and the relative transmittance (frontal direction) which were found by simulations performed on the case where the rib 24 is located such that the inner side face 24a does not overlap the pixel electrode 11 (such that the inner end of the rib 24 is located on the edge portion EG1). As can be seen from a comparison between FIG. 12 and FIG. 11, unless the inner side face 24a overlaps the pixel electrode 11, the area R2 in which the liquid crystal molecules 3a fall toward the observer of the figure (portion in which the relative transmittance has the minimum value) cannot be moved outward sufficiently. Therefore, the dark line cannot be expelled outward sufficiently, and so the effect of suppressing the appearance of the dark line is decreased. As can be seen from this, it is preferable that the rib 24 is located such that at least a part of the inner side face 24a overlaps the pixel electrode 11.

Figure 13:
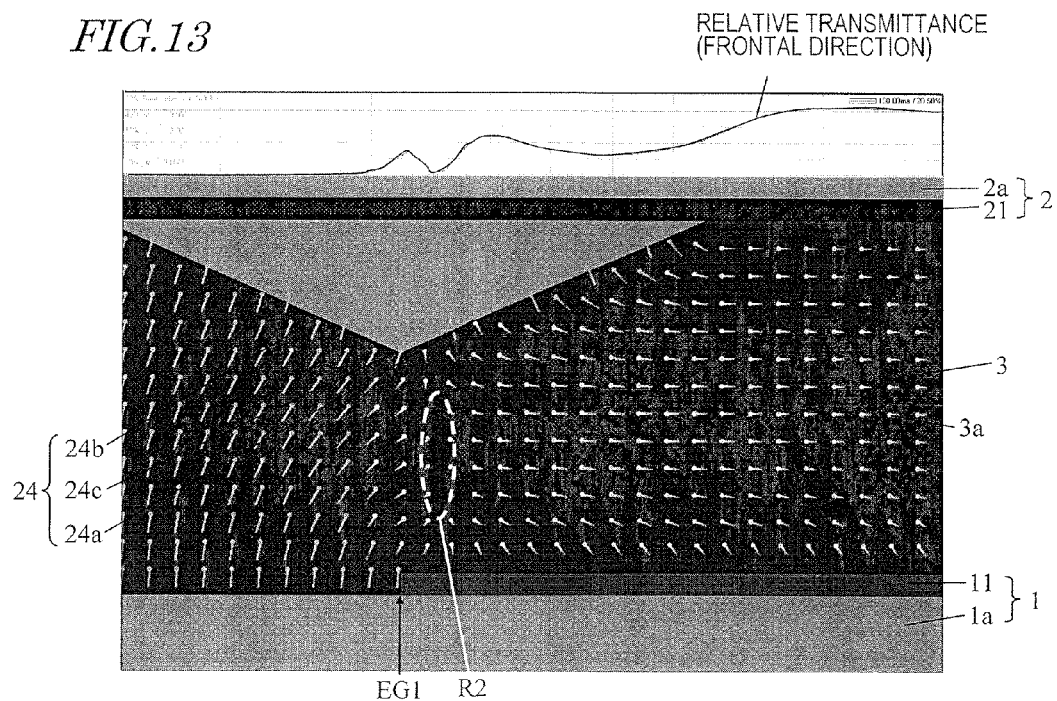
FIG. 13 is a cross-sectional view showing a part of a pixel area of a liquid crystal display device in a preferable embodiment according to the present invention, and shows alignment directions of liquid crystal molecules and the relative transmittance (frontal direction) which were found by simulations.

Nonetheless, it is not necessary that the inner side face 24a of the rib 24 excessively overlaps the pixel electrode 11. FIG. 13 shows the alignment directions of the liquid crystal molecules 3a and the relative transmittance (frontal direction) which were found by simulations performed on the case where the rib 24 is located such that the inner side face 24a entirely overlaps the pixel electrode 11 (such that the apex 24c of the rib 24 is located on the edge portion EG1). In this case, as shown in FIG. 13, the area R2 in which the liquid crystal molecules 3a fall toward the observer of the figure (portion in which the relative transmittance has the minimum value) can be moved outward sufficiently, and the width of the area R2 (width of the portion in which the relative transmittance is dropped) is narrow. Therefore, the dark line can be made sufficiently thin and expelled outward sufficiently. However, as can be seen from a comparison between FIG. 13 and FIG. 11, in the case of FIG. 13, there is an area in which the transmittance is slightly lowered inner to the area R2. A reason for this is that in the area having the rib 24, the liquid crystal layer 3 is made thinner by the height of the rib 24 and so the retardation given to light by the liquid crystal layer 3 is decreased. Another reason for this is that the pretilt angle of the liquid crystal molecules 3a in the vicinity of the rib 24 is different from the pretilt angle of the liquid crystal molecules 3a on the second alignment film 22 in an area in which the rib 24 is not provided.

As understood from the above description made with reference to FIG. 12 and FIG. 13, it is preferable that the rib 24 is located such that the inner side face 24a partially overlaps the pixel electrode 11. In other words, it is preferable that the rib 24 is located as shown in FIG. 11 such that the apex 24c is located outer to the edge portion of the pixel electrode 11 and that the edge portion of the pixel electrode 11 overlaps the inner side face 24a. According to the studies of the present inventors, the overlapping width of the inner side face 24a of the rib 24 and the pixel electrode 11 is preferably 0 µm or greater from the viewpoint of sufficiently increasing the effect of suppressing the appearance of the dark line, and is preferably 10 µm or less from the viewpoint of suppressing the reduction of the transmittance caused by the excessive overlap of the rib 24 and the pixel electrode 11. In consideration of these two viewpoints, it is most preferable that the overlapping width of the inner side face 24a of the rib 24 and the pixel electrode 11 is about 5 µm (more specifically, 2.5 µm or greater and 7.5 µm or less).

Figure 14:
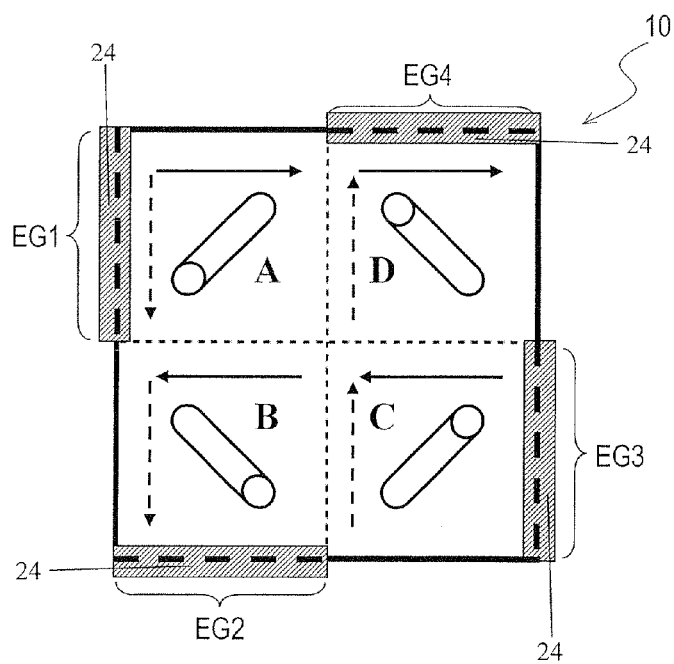
FIG. 14 is a plan view schematically showing another example of one pixel area of a liquid crystal display device in a preferable embodiment according to the present invention.

In the above, structures in which the rib 24 is provided in an area where the first type of dark line would appear. The rib 24 may be provided also in an area where the second type of dark line is would appear. FIG. 14 shows a structure in which the rib 24 is provided in the areas where the first type of dark line would appear and the areas where the second type of dark line would appear.

In the structure shown in FIG. 14, the ribs 24 are provided in the areas corresponding to the edge portions EG1 and EG3 and also in the areas corresponding to the edge portions EG2 and EG4. The azimuthal angle component of the alignment regulation force caused by the oblique electric field generated in the vicinity of the edge portion EG2 (direction e2 in FIG. 1) and the azimuthal angle component of the alignment regulation force caused by the first alignment film 12 in the area corresponding to the liquid crystal domain B are opposite to each other. As described above, the azimuthal angle component of the alignment regulation force caused by the first alignment film 12 can be represented by an arrow in the same direction as the pretilt directions of the first alignment film 12 represented by the dashed line arrows in FIG. 9. Like in the vicinity of the edge portion EG2, the azimuthal angle direction of the alignment regulation force caused by the oblique electric field generated in the vicinity of the edge portion EG4 (direction e4 in FIG. 1) and the azimuthal angle direction of the alignment regulation force caused by the first alignment film 12 in the area corresponding to the liquid crystal domain D are opposite to each other. Therefore, in the vicinity of the edge portions EG2 and EG4, the second type of dark line would appear if no measure was taken.

Figure 15:
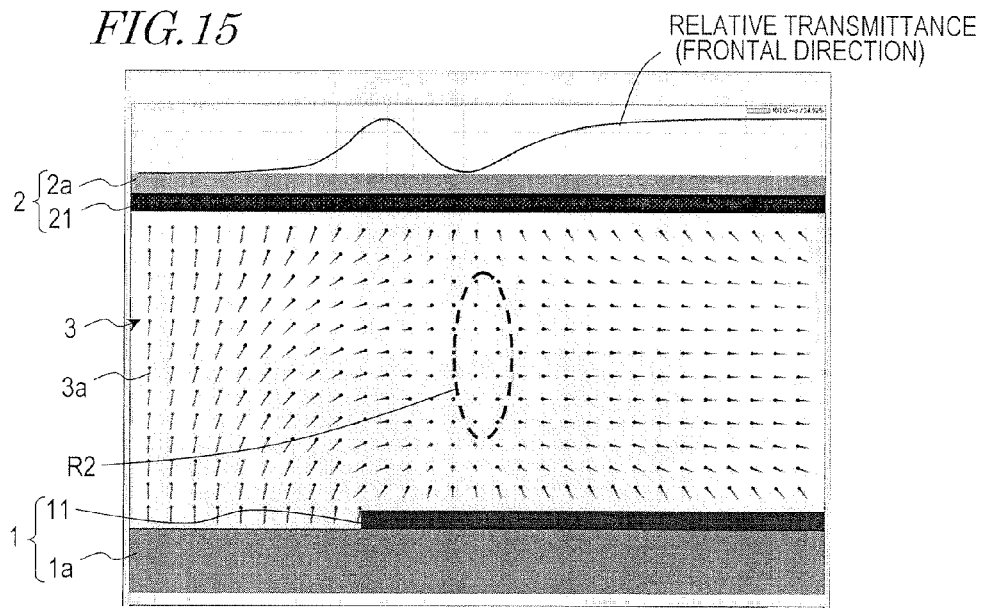
FIG. 15 is a cross-sectional view showing a part of a pixel area of a liquid crystal display device in a preferable embodiment according to the present invention, and shows alignment directions of liquid crystal molecules and the relative transmittance (frontal direction) which were found by simulations.
Figure 16:
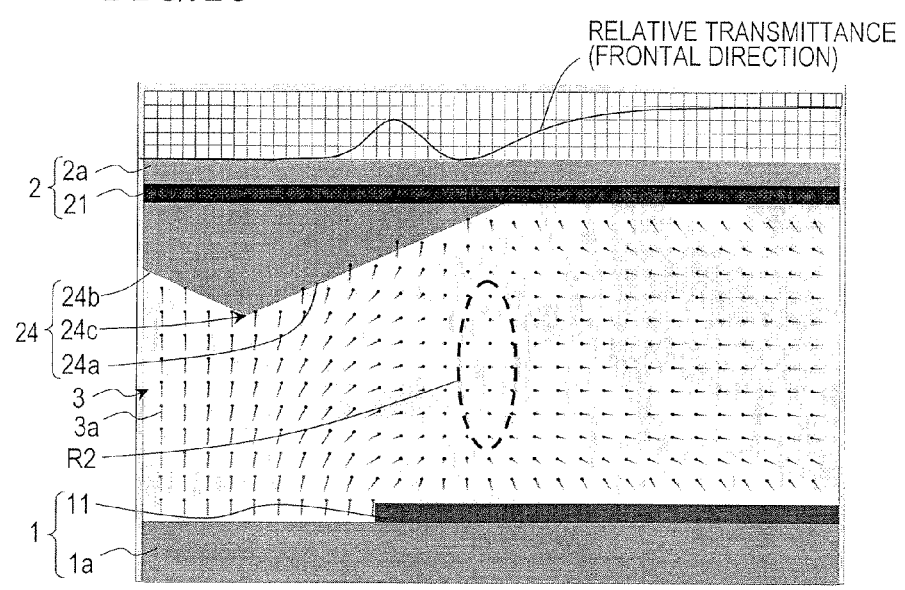
FIG. 16 is a cross-sectional view showing a part of a pixel area of a liquid crystal display device in a preferable embodiment according to the present invention, and shows alignment directions of liquid crystal molecules and the relative transmittance (frontal direction) which were found by simulations.

FIG. 15 and FIG. 16 show the alignment directions of the liquid crystal molecules 3a and the relative transmittance (frontal direction) which were found by simulations respectively performed on the case where the rib 24 is provided in the area corresponding to the edge portion EG2, and on the case where the rib 24 is not provided in such an area. FIG. 15 corresponds to a cross-sectional view of the bottom half of the liquid crystal domain B in FIG. 9 taken along a line having an azimuthal angle of 90°. FIG. 16 corresponds to a cross-sectional view of the bottom half of the liquid crystal domain B in FIG. 14 taken along a line having an azimuthal angle of 90°.

As can be seen from a comparison between FIG. 15 and FIG. 16, even where the rib 24 is provided in the area corresponding to the edge portion EG2, the area R2 in which the liquid crystal molecules 3a fall toward the observer of the figure is not moved outward almost at all. The width of the area R2 is not narrowed almost at all. Accordingly, in a curve representing the relative transmittance, a portion representing the minimum value is not moved outward almost at all, and the width of a portion in which the relative transmittance is dropped (lowered) is not narrowed almost at all. A reason for this is that in the area in which the second type of dark line appears, the azimuthal angle component of the alignment regulation force of the inner side face 24a of the rib 24 and the azimuthal angle component caused by the second alignment film 22 are not the same as each other (different by about 90° from each other), and therefore, even where the rib 24 is provided, the alignment regulation force exerted on the liquid crystal layer 3 from the CF substrate 2 is not strengthened.

Figure 17:
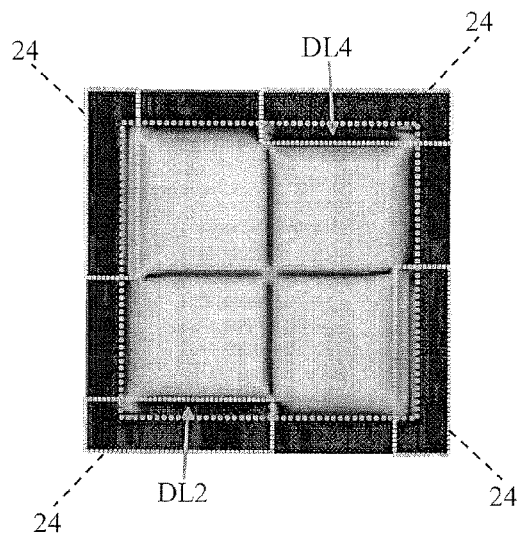
FIG. 17 shows the transmittance of the pixel area shown in FIG. 14 in the presence of a voltage, which was found by simulations.

FIG. 17 shows the transmittance of the pixel area 10 shown in FIG. 14 in the presence of a voltage, which was found by simulations. It is understood from FIG. 17 that no dark line appears in the liquid crystal domains A and C (top left and bottom right liquid crystal domains in the figure), whereas the dark lines DL2 and DL4 appear in the liquid crystal domains B and D (bottom left and top right liquid crystal domains in the figure).

As described above, even where the rib 24 is provided in the area where the second type of dark line appears, the effect of suppressing the dark line is small. Therefore, the rib 24 may or may not be provided in the area where the second type of dark line appears. By providing the rib 24 only in the area where the first type of dark line appears, the transmittance can be effectively improved. In the case where the rib 24 is provided also in the area where the second type of dark line appears, the transmittance may be rather lowered if the finish is slightly shifted from the design value.

Figure 18:
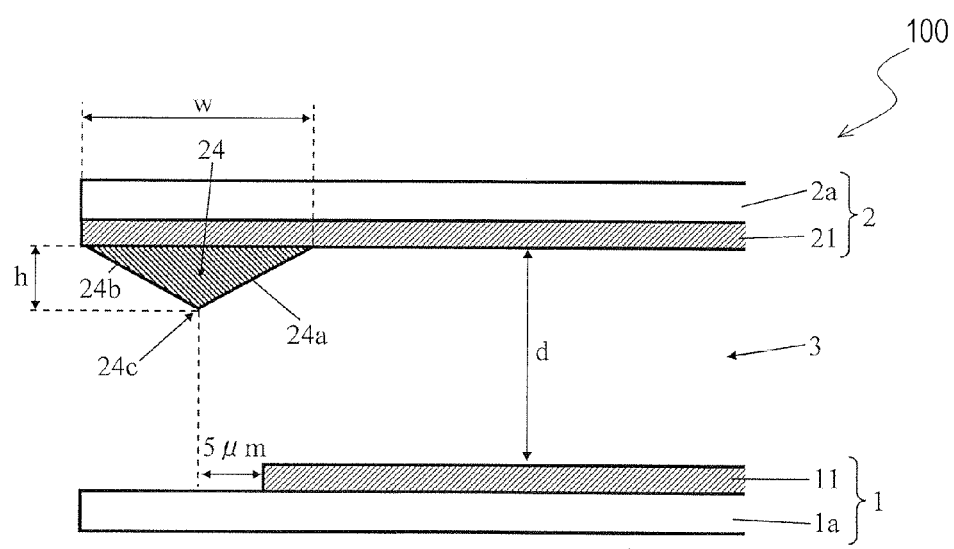
FIG. 18 is a cross-sectional view schematically showing a liquid crystal display device in a preferable embodiment according to the present invention.

Now, a preferable height and a preferable width of the rib 24 will be described. As shown in FIG. 18, in the area where the first type of dark line would appear, the rib 24 is provided such that the apex 24c is 5 μm away from the edge portion of the pixel electrode 11. While the height h and the width w of the rib 24 are changed, the ratio T/T0 of the transmittance T of the pixel area 10 with respect to the transmittance T0 when the rib 24 is not provided was calculated. The thickness (cell gap) d of the liquid crystal layer 3 was 3.4 μm, and the width of the pixel area 10 was 60 μm.

Figure 19:
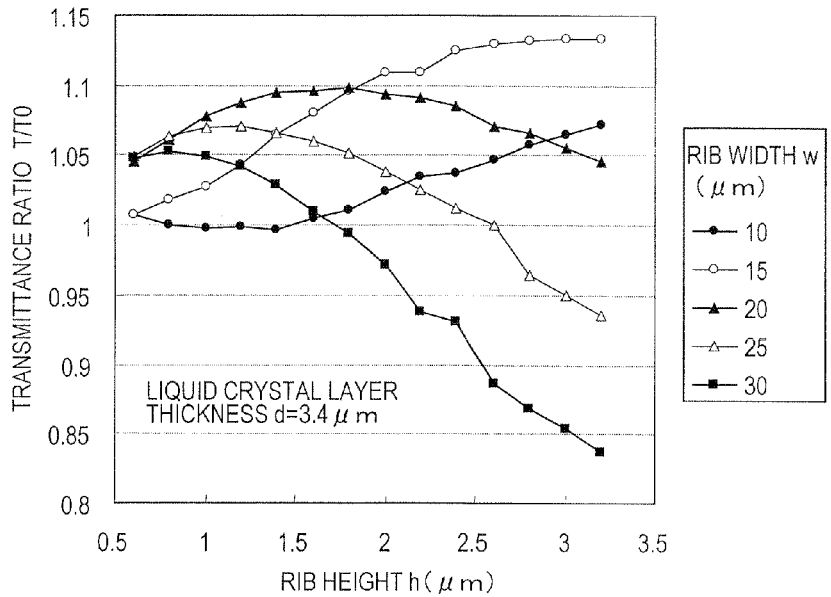
FIG. 19 is a graph showing the relationship among the rib height h, the rib width w, and the transmittance ratio T/T0 in the case where the cell gap d 3.4 μm.
Figure 20:
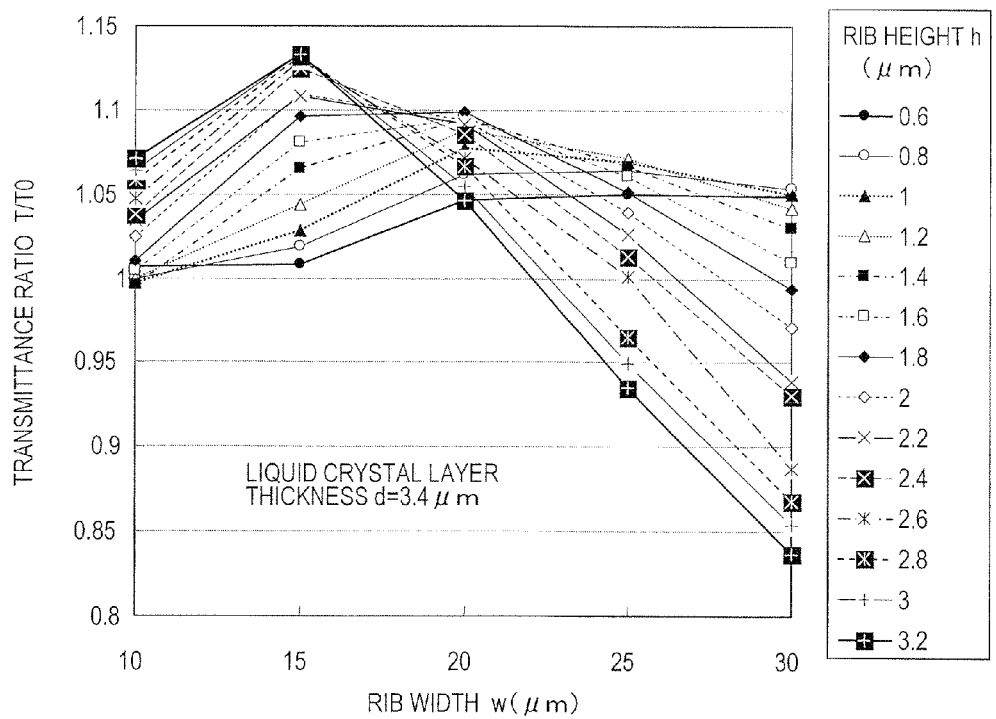
FIG. 20 is a graph showing the relationship among the rib height h, the rib width w, and the transmittance ratio T/T0 in the case where the cell gap d 3.4 μm.

FIG. 19 and FIG. 20 show the relationship among the rib height h, the rib width w, and the transmittance ratio T/T0. FIG. 19 is a graph in which the horizontal axis represents the rib height h and the vertical axis represents the transmittance ratio T/T0. FIG. 20 is a graph in which the horizontal axis represents the rib width w and the vertical axis represents the transmittance ratio T/T0. In FIG. 19 and FIG. 20, a transmittance ratio T/T0 exceeding 1 means that the transmittance is improved. As the value of T/T0 is larger, the degree of improvement is higher.

It is understood from FIG. 19 and FIG. 20 that there is an overall tendency that when the rib 24 is provided, the transmittance is basically improved, but where the rib 24 is too high or too wide, the transmittance is rather reduced. It is also understood that when the rib height h is 3.2 μm and the rib width w is 15 μm, the transmittance is most improved.

It is also understood from FIG. 19 that where the rib width w is relatively small, the transmittance is more improved as the rib height h is larger. It is also understood that where the rib width w is too large, the transmittance is lowered. This occurs for the reasons described above with reference to FIG. 13. A reason is that in the area where the rib 24 is provided, the cell gap d is smaller by the height of the rib 24, and so the retardation given to light by the liquid crystal layer 3 is smaller. Another reason is that the pretilt angle of the liquid crystal molecules 3a in the vicinity of the rib 24 is different from the pretilt angle of the liquid crystal molecules 3a on the second alignment film 22 in the area where the rib 24 is not provided.

It is understood from FIG. 20 that where the rib height h is relatively small, the transmittance is most improved when the rib width w is 20 μm, and that where the rib height h is relatively large, the transmittance is most improved when the rib width w is 15 μm. Namely, FIG. 20 shows that it is effective to narrow the rib 24 as the rib 24 is higher. It is also understood that when the rib width w is changed, the transmittance is rapidly changed. Especially where the rib height h is relatively large, the dependence of the transmittance on the rib width w is conspicuous. Therefore, in consideration of various margins for mass production, it is preferable that the rib height h is set to about 1.4 μm to 2.6 μm and the rib width w is set to about 15 μm to 20 μm, instead of the above-mentioned optimum conditions (the rib height h is 3.2 μm and the rib width w is 15 μm).

Figure 21:
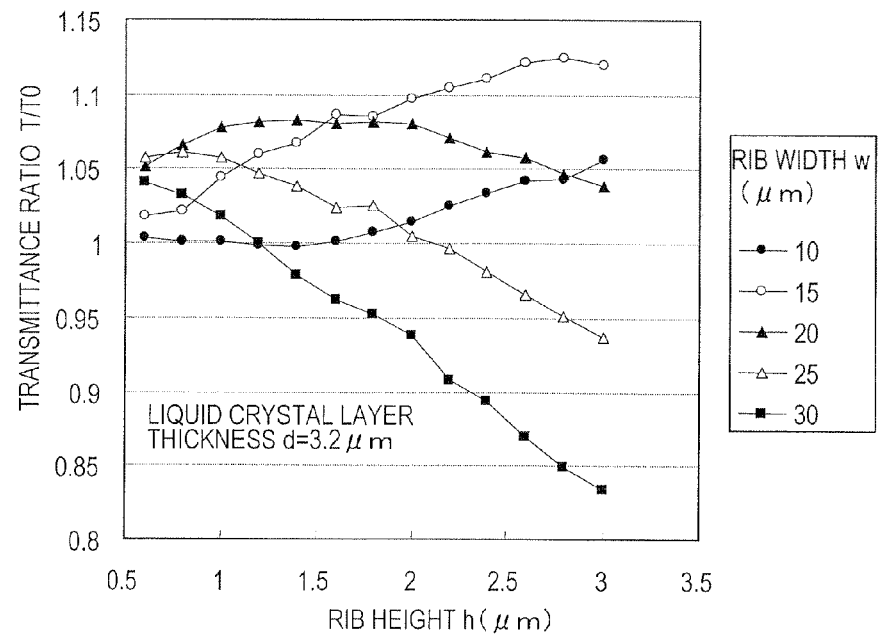
FIG. 21 is a graph showing the relationship among the rib height h, the rib width w, and the transmittance ratio T/T0 in the case where the cell gap d=3.2 μm.
Figure 22:
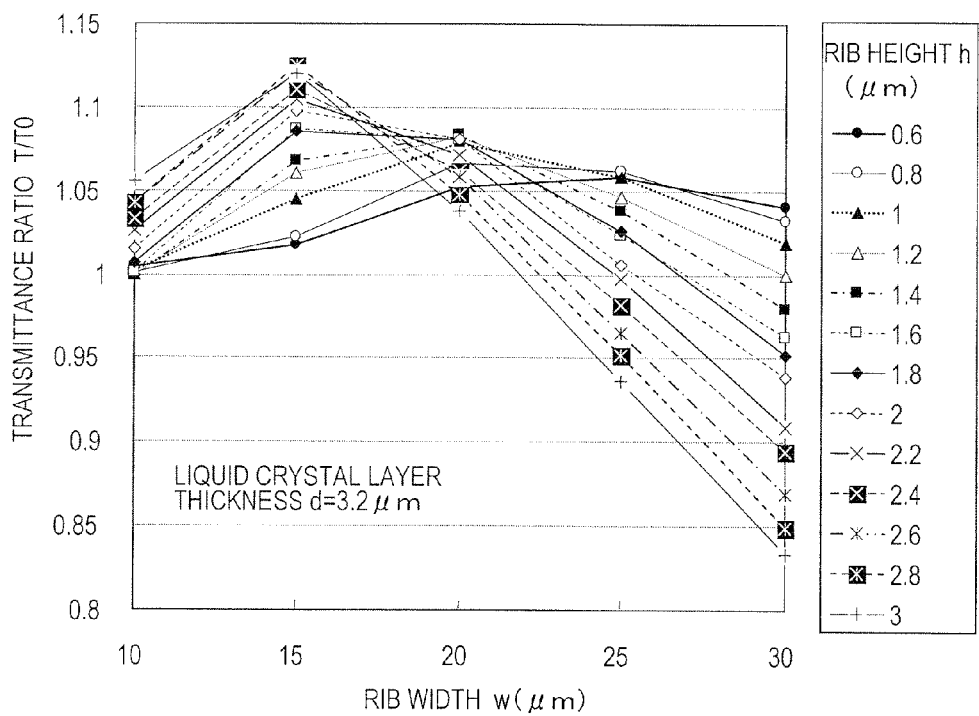
FIG. 22 is a graph showing the relationship among the rib height h, the rib width w, and the transmittance ratio T/T0 in the case where the cell gap d=3.2 μm.
Figure 23:
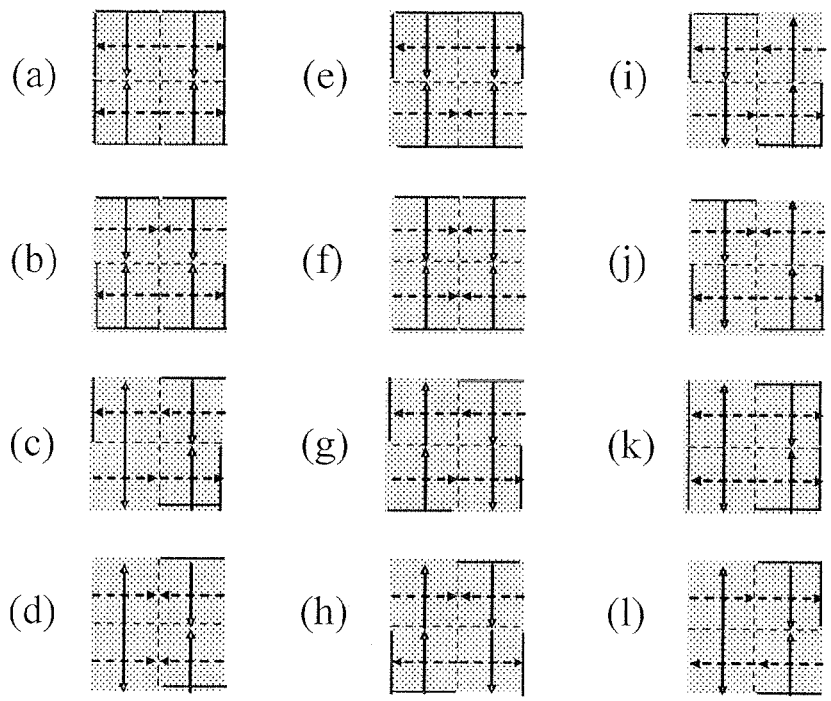
FIGS. 23(*a*) through (*l*) show examples of dividing patterns in the case where one pixel area is divided into four liquid crystal domains and the four liquid crystal domains are located in a matrix of 2 rows×2 columns.
Figure 24:
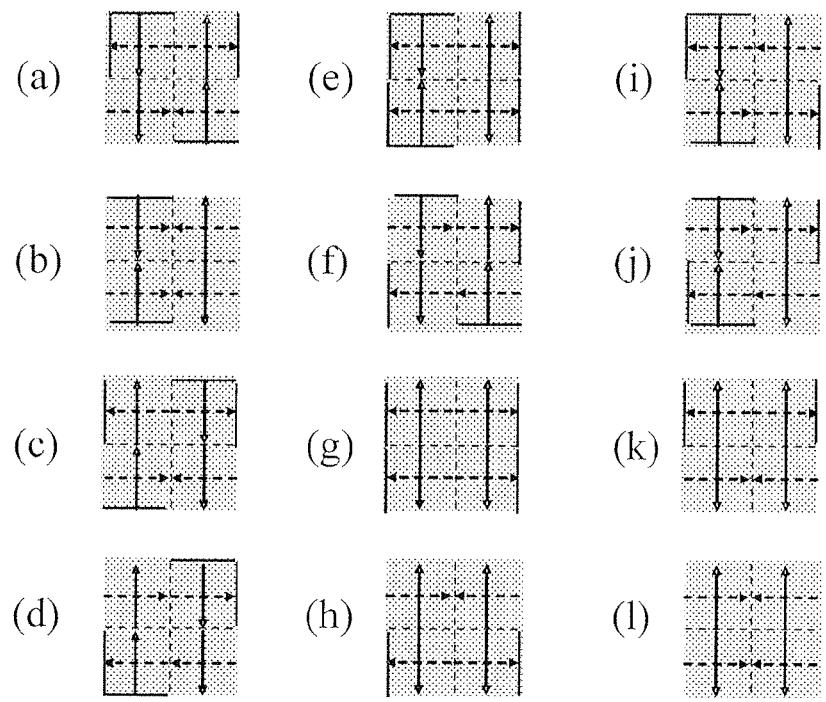
FIGS. 24(*a*) through (*l*) show examples of dividing patterns in the case where one pixel area is divided into four liquid crystal domains and the four liquid crystal domains are located in a matrix of 2 rows×2 columns.
Figure 25:
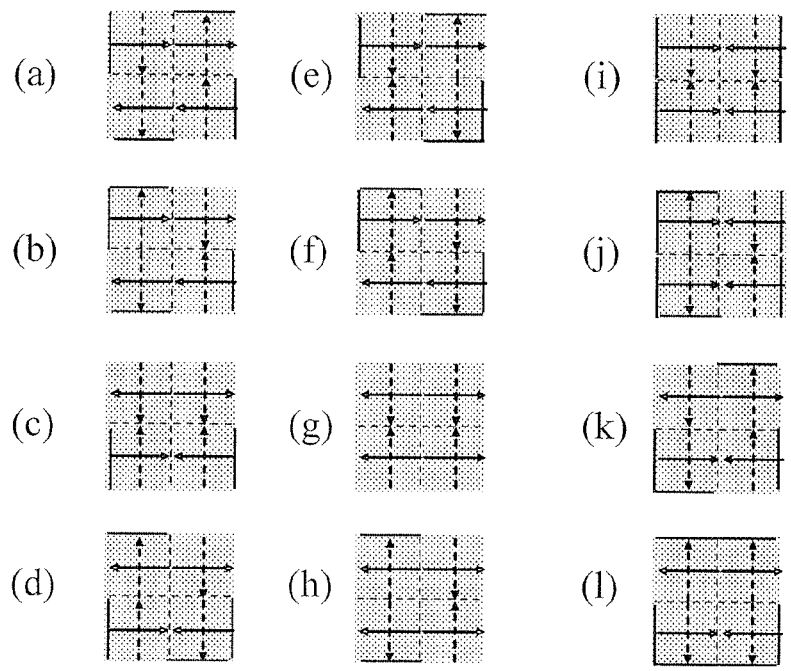
FIGS. 25(*a*) through (*l*) show examples of dividing patterns in the case where one pixel area is divided into four liquid crystal domains and the four liquid crystal domains are located in a matrix of 2 rows×2 columns.
Figure 26:
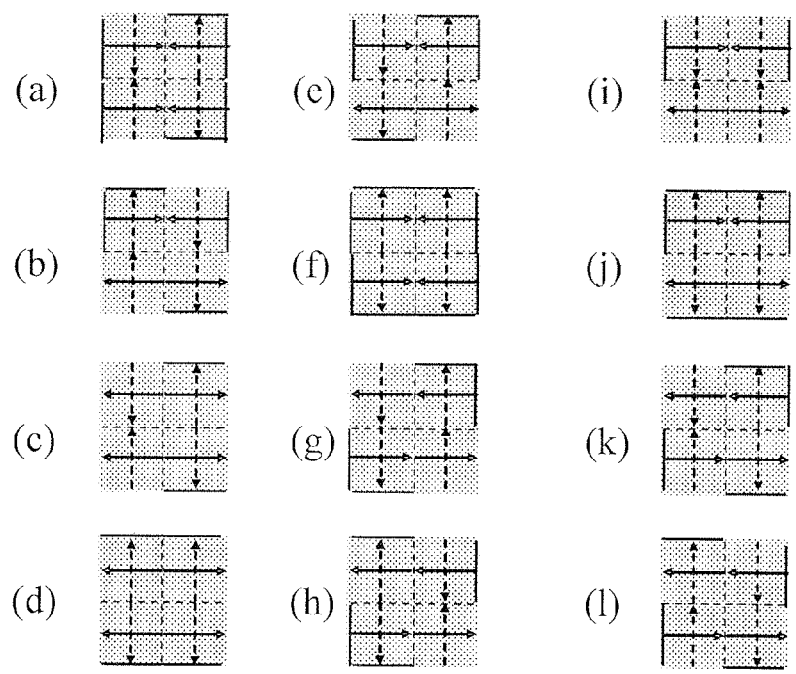
FIGS. 26(*a*) through (*l*) show examples of dividing patterns in the case where one pixel area is divided into four liquid crystal domains and the four liquid crystal domains are located in a matrix of 2 rows×2 columns.
Figure 27:
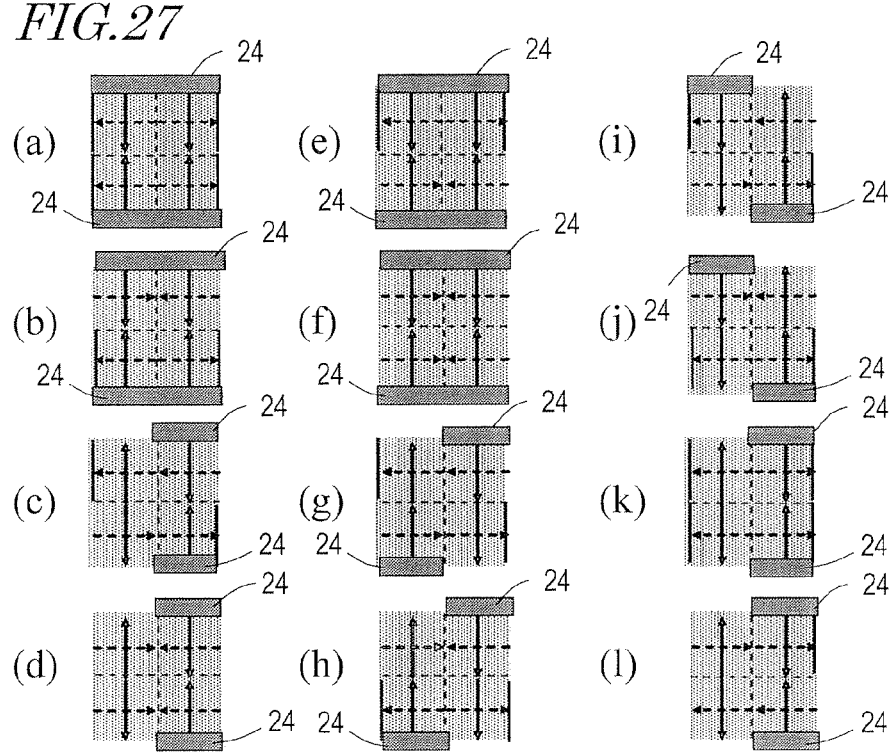
FIGS. 27(*a*) through (*l*) respectively show structures obtained by providing ribs in areas where a first type of dark line appears in the dividing patterns shown in FIG. 23(*a*) through (*l*).
Figure 28:
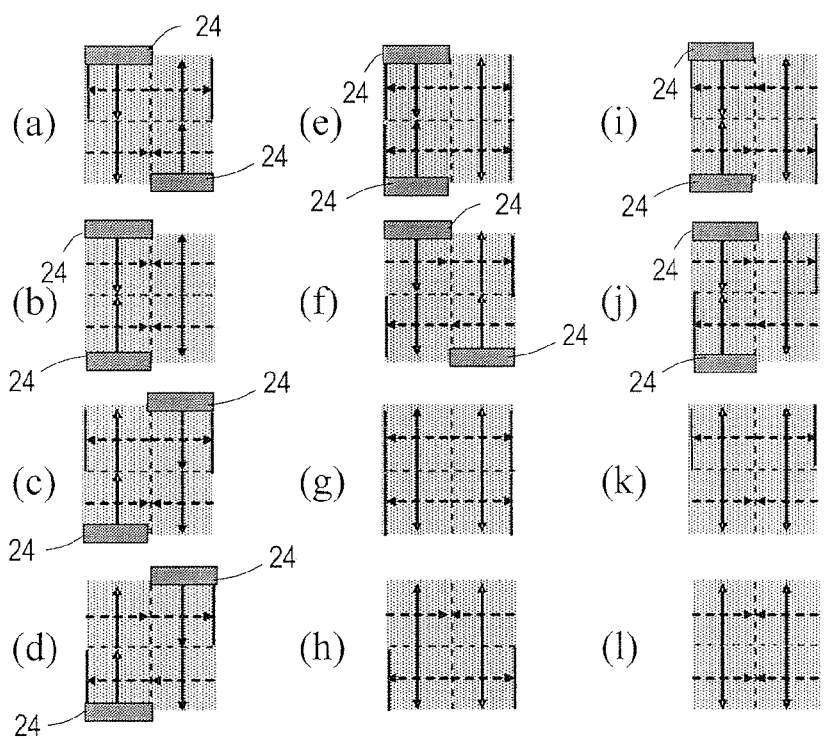
FIGS. 28(*a*) through (*l*) respectively show structures obtained by providing ribs in areas where the first type of dark line appears in the dividing patterns shown in FIG. 24(*a*) through (*l*).
Figure 29:
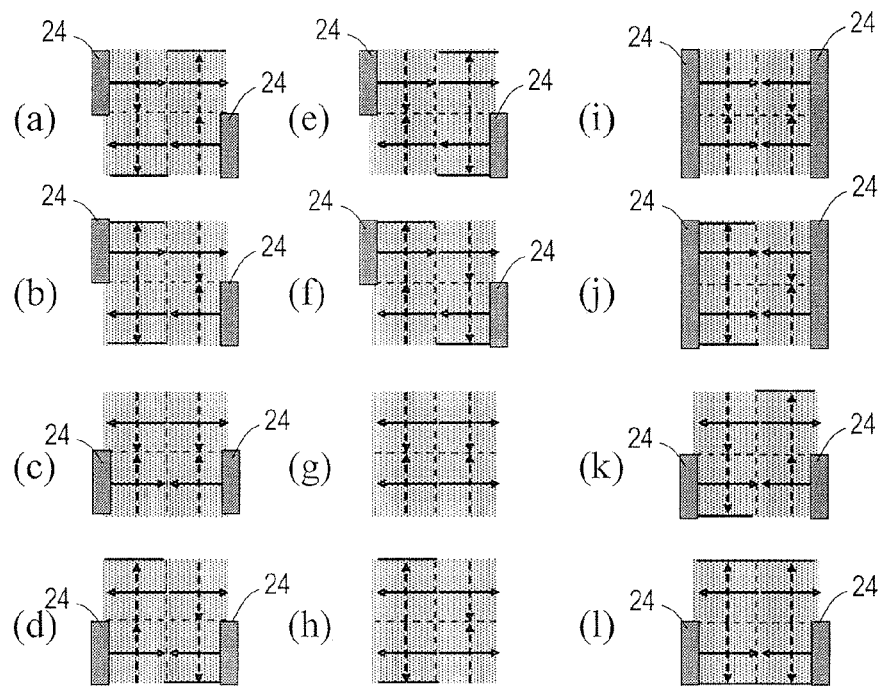
FIGS. 29(*a*) through (*l*) respectively show structures obtained by providing ribs in areas where the first type of dark line appears in the dividing patterns shown in FIG. 25(*a*) through (*l*).
Figure 30:
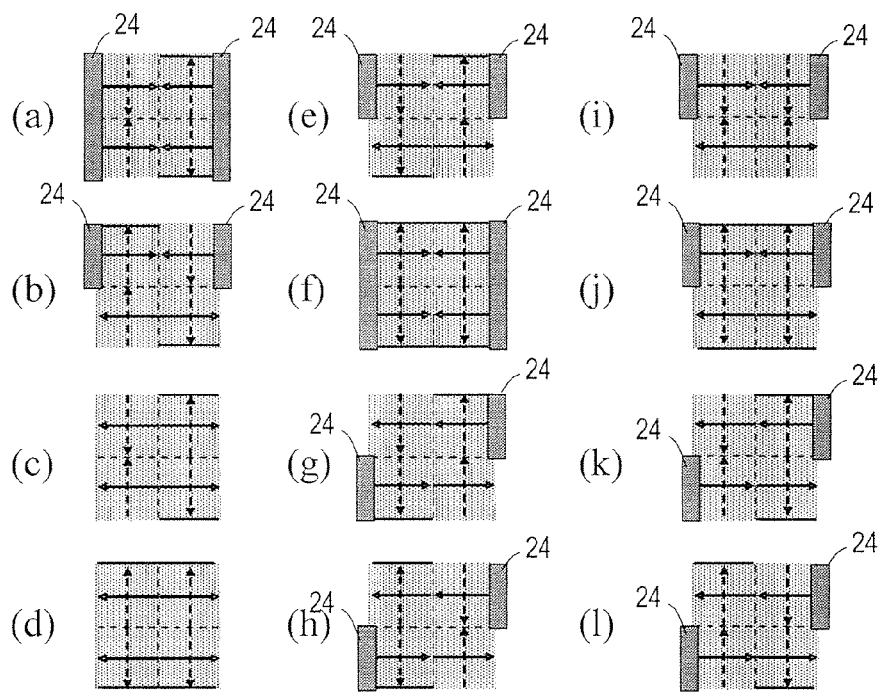
FIGS. 30(*a*) through (*l*) respectively show structures obtained by providing ribs in areas where the first type of dark line appears in the dividing patterns shown in FIG. 26(*a*) through (*l*).

Now, results of a similar investigation performed on the case where the cell gap d is 3.2 μm will be described. FIG. 21 and FIG. 22 show the relationship among the rib height h, the rib width w, and the transmittance ratio T/T0 at this cell gap. FIG. 21 is a graph in which the horizontal axis represents the rib height h and the vertical axis represents the transmittance ratio T/T0. FIG. 22 is a graph in which the horizontal axis represents the rib width w and the vertical axis represents the transmittance ratio T/T0.

It is understood from FIG. 21 and FIG. 22 that in the case where the cell gap d is 3.2 μm, substantially the same tendency is seen as in the case where the cell gap d is 3.4 μm. It is also understood that the degree of improvement of the transmittance is higher in the case where the cell gap d is 3.4 μm. The conditions under which the transmittance is most improved in the case where the cell gap d is 3.2 μm are that the rib height h is 3 μm and the rib width w is 15 μm. However, in consideration of various margins for mass production, it is preferable that the rib height h is set to about 1.2 μm to 2.4 μm and the rib width w is set to about 15 μm to 20 μm, instead of such optimum conditions.

As a result of analyzing the calculation results shown in FIG. 19 through FIG. 22 in more detail, it was found that when the rib 24 fulfills a certain condition, an effect of improving the transmittance is provided. Specifically, the transmittance is improved (i.e., the transmittance ratio T/T0 exceeds 1) when the height h (μm) and the width w (μm) of the rib 24 and the thickness d (μm) of the liquid crystal layer 3 fulfill the relationship of the following expression (1).

$$5d \cdot \exp(-0.18w) \leq h \leq 12d \cdot \exp(-0.13w) \tag{1}$$

In consideration of restrictions for the actual production of the liquid crystal display device, it is preferable that the height h (μm) and the width w (μm) of the rib 24 and the thickness d (μm) of the liquid crystal layer 3 further fulfill the relationships of the following expressions (2), (3) and (4).

$$2 \leq d \leq 6 \tag{2}$$

$$10 \leq w \leq 30 \tag{3}$$

$$0.6 \leq h \leq d \tag{4}$$

In expression (4), the rib height h is 0.6 μm or greater because when the rib height h is less than 0.6 μm, the alignment regulation force provided by the rib 24 is small and the effect of improving the transmittance is small. The rib height h is equal to or less than the cell gap d because the rib height h cannot be equal to or greater than the cell gap d.

The pattern of dividing the pixel area is not limited to the above-described patterns as examples. In the case where one pixel area is divided into four liquid crystal domains and the four liquid crystal domains are located in a matrix of 2 rows×2 columns, there are 48 dividing patterns as shown in FIG. 23(a) through FIG. 26(l). In these figures, like in FIG. 9, in each of the areas corresponding to the liquid crystal domains, the pretilt directions of the first alignment film 12 are represented by the dashed line arrows, and the pretilt directions of the second alignment film 22 are represented by the solid line arrows. The dark lines appearing in the case where the ribs 24 are not provided (both of the first type of dark lines and the second type of dark lines) are shown by solid lines in the vicinity of the edge portions of the pixel electrode 11. As shown in FIG. 23(a) through FIG. 26(l), the number and positions of the areas where the dark lines appear are different for each dividing pattern.

FIG. 27(a) through FIG. 30(l) respectively show structures obtained by providing the ribs 24 in the areas where the first type of dark line appears in the dividing patterns shown in FIG. 23(a) through FIG. 26(l). In the dividing patterns shown in FIGS. 27(a), (b), (e) and (f), FIGS. 29(i) and (j), and FIGS. 30(a) and (f), the ribs 24 are provided in all of the four liquid crystal domains because the first type of dark line would otherwise appear in all of the four liquid crystal domains. In the dividing patterns in FIGS. 27(c), (d), (g) through (l), FIGS. 28(a) through (f), (i) and (j), FIGS. 29(a) through (f), (k) and (l), and FIGS. 30(b), (e) and (g) through (l), the ribs 24 are provided in two among the four liquid crystal domains because the first type of dark line would otherwise appear in such two liquid crystal domains. In the dividing patterns in FIGS. 28(g), (h), (k) and (l), FIGS. 29(g) and (h), and FIGS. 30(c) and (d), the ribs 24 are not provided because the first type of dark line would not appear.

In the case where optical alignment processing is performed as the alignment processing, it is preferable that a part of the 48 patterns shown in FIG. 23(a) through 26(l) are used. This will be described specifically, hereinafter.

In order to realize the multi-domain structure by optical alignment processing, it is necessary to perform exposure in sections on an optical alignment film by use of an optical mask. The optical mask used in this operation includes striped light shielding portions.

Figure 31:
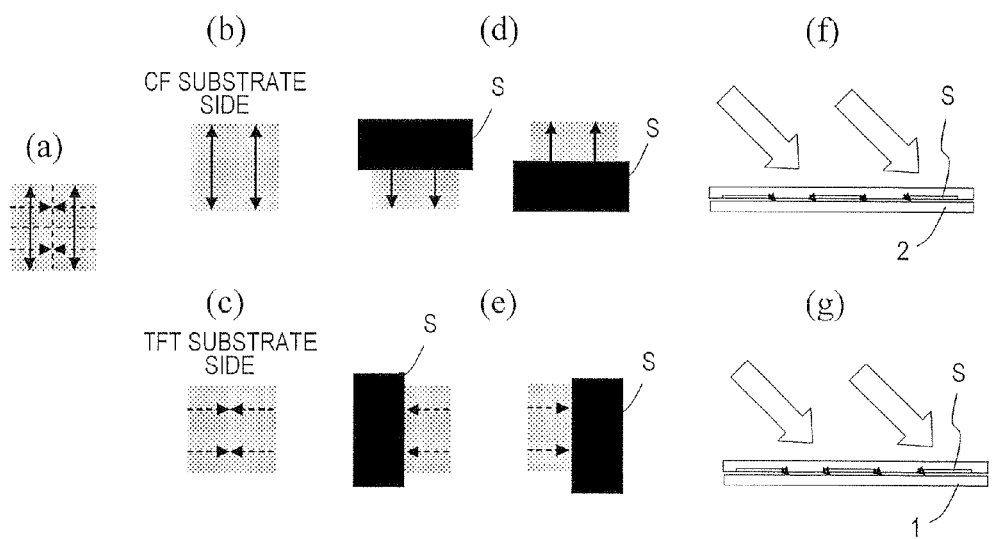
FIGS. 31(*a*) through (*g*) show a light irradiation method for realizing a certain dividing pattern.

In order to realize the dividing pattern shown in, for example, FIG. 31(a) (same as the dividing pattern shown in FIG. 24(l)), it is necessary to give the pretilt direction shown in FIG. 31(b) to the second alignment film 22 on the CF substrate 2 and to give the pretilt direction shown in FIG. 31(c) to the first alignment film 12 on the TFT substrate 1. Therefore, exposure in sections is performed on the CF substrate 2 side by use of a light shielding portion S of the optical mask provided as shown in FIG. 31(d), and exposure in section is performed on the TFT substrate 1 side by use of the light shielding portion S of the optical mask provided as shown in FIG. 31(e). As shown in FIGS. 31(f) and (g), light is directed in a direction oblique with respect to a direction perpendicular to the direction in which the light shielding portion S extends. Namely, the CF substrate 2 side is irradiated with light directed in a direction oblique to the length direction (column direction) in the state where the light shielding portion S is located so as to extend in the transverse direction (row direction). The TFT substrate 1 side is irradiated with light directed in a direction oblique to the transverse direction in the state where the light shielding portion S is located so as to extend in the length direction.

Figure 32:
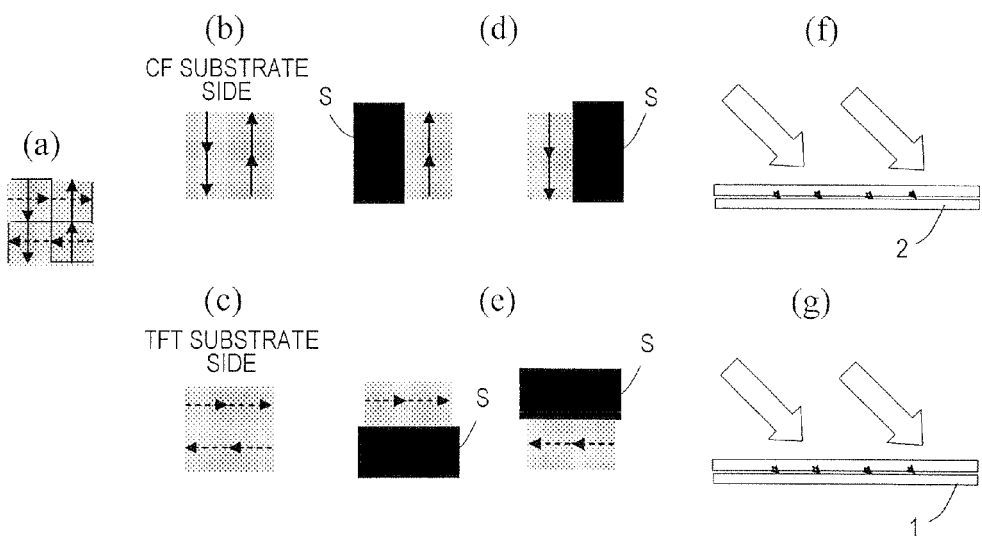
FIGS. 32(*a*) through (*g*) show a light irradiation method for realizing a certain dividing pattern.
Figure 33:
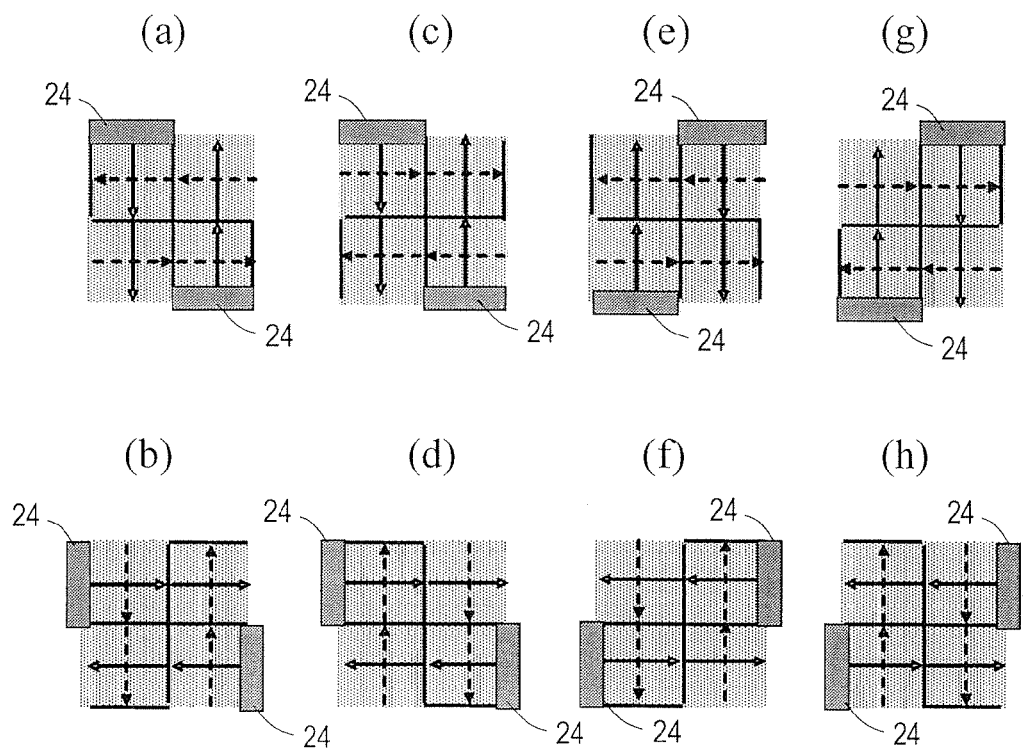
FIGS. 33(*a*) through (*h*) show examples of preferable dividing patterns.
Figure 34:
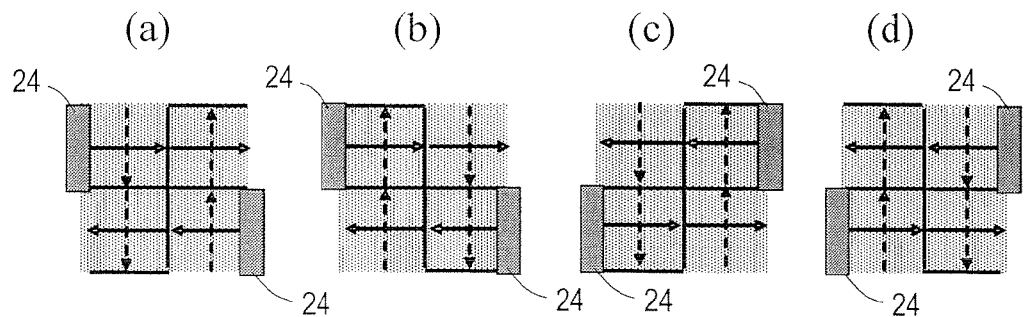
FIGS. 34(*a*) through (*d*) show examples of more preferable dividing patterns.

By contrast, in order to realize the dividing pattern shown in, for example, FIG. 32(a) (same as the dividing pattern shown in FIG. 24(f)), it is necessary to give the pretilt direction shown in FIG. 32(b) to the second alignment film 22 on the CF substrate 2 and to give the pretilt direction shown in FIG. 32(c) to the first alignment film 12 on the TFT substrate 1. Therefore, exposure in sections is performed on the CF substrate 2 side by use of the light shielding portion S of the optical mask provided as shown in FIG. 32(d), and exposure in sections is performed on the TFT substrate 1 side by use of the light shielding portion S of the optical mask provided as shown in FIG. 32(e). As shown in FIGS. 32(f) and (g), light is directed in a direction oblique with respect to a direction parallel to the direction in which the light shielding portion S extends. Namely, the CF substrate 2 side is irradiated with light directed in a direction oblique to the length direction in the state where the light shielding portion S is located so as to extend in the length direction. The TFT substrate 1 side is irradiated with light directed in a direction oblique to the transverse direction in the state where the light shielding portion S is located so as to extend in the transverse direction.

As described above, the relationship between the direction in which the light shielding portion S of the optical mask extends and the light irradiation direction is different for each dividing pattern. In one case, light irradiation is performed in a direction oblique with respect to a direction perpendicular to the direction in which the light shielding portion S extends (referred to as the "irradiation direction A" for the sake of convenience); and in the other case, light irradiation is performed in a direction oblique with respect to a direction parallel to the direction in which the light shielding portion S extends (referred to as the "irradiation direction B" for the sake of convenience).

When the irradiation method A is used, there may be problems that the exposure position is shifted or exposure is not performed sufficiently due to a slight space between the optical mask and the substrate or diffraction. Therefore, it is preferable that a dividing pattern realized only by the irradiation method B is used.

Specifically, the dividing patterns realized only by the irradiation method B are eight patterns shown in FIGS. 33(a) through (h). In any of the dividing patterns shown in FIGS. 33(a) through (h), the first type of dark line may appear in two among the four liquid crystal domains. Therefore, the ribs 24 are provided in correspondence with such two liquid crystal domains. The tilt directions of the two liquid crystal domains in which the ribs 24 are provided have an angle of about 180° with each other in any of the dividing patterns.

The above description is made with an example of generally square pixel areas. However, actual pixel areas are typically rectangular with the length direction being longer. Namely, the width of the pixel area along the vertical direction of the display plane (typically, the direction in which the source bus lines extend) is more often larger than the width of the pixel area along the horizontal direction of the display plane (typically, the direction in which the gate bus lines extend). Accordingly, the effect of improving the transmittance is greater where the ribs 24 are provided generally parallel to the vertical direction of the display plane than where the ribs 24 are provided generally parallel to the horizontal direction of the display plane.

Namely, among the eight dividing patterns shown in FIGS. 33(a) through (h), it is further preferable to use any of the four dividing patterns shown in FIGS. 34(a) through (d) in which the edge portions where the first type of dark line appears are generally parallel to the vertical direction of the display plane.

INDUSTRIAL APPLICABILITY

A liquid crystal display device according to the present invention is preferably usable for applications in which high quality display is demanded such as TV receivers and the like.

REFERENCE SIGNS LIST

1 TFT substrate (active matrix substrate)
1a, 2a Transparent plate
2 CF substrate (counter substrate)
3 Liquid crystal layer
3a Liquid crystal molecules
10, 20, 30, 40 Pixel area
11 Pixel electrode
12 First alignment film
13, 23 Polarizing plate
21 Counter electrode
22 Second alignment film
24 Rib
24a Side face of the rib (inner side face)
24b Side face of the rib (outer side face)
24c Apex of the rib (ridgeline)
100 Liquid crystal display device
SD1 through SD4 Edge of the pixel electrode
EG1 through EG4 Edge portion of the pixel electrode
A through D Liquid crystal domain t1 though t4 Tilt direction (reference alignment direction)
e1 through e4 Azimuthal angle direction perpendicular to the edge of the pixel electrode and directed to the inside of the pixel electrode
DL1 through DL4 Dark line

The invention claimed is:

1. A liquid crystal display device, comprising:
a vertical alignment type liquid crystal layer;
a first substrate and a second substrate facing each other with the liquid crystal layer interposed therebetween;
a first electrode provided in the first substrate on the liquid crystal layer side and a second electrode provided in the second substrate on the liquid crystal layer side; and
a first alignment film provided between the first electrode and the liquid crystal layer and a second alignment film provided between the second electrode and the liquid crystal layer;
wherein:
the liquid crystal display device includes a plurality of pixel areas located in a matrix;
each of the plurality of pixel areas includes a first liquid crystal domain in which a tilt direction of liquid crystal molecules at the center and in the vicinity thereof in a layer plane and in a thickness direction of the liquid crystal layer when a voltage is applied between the first electrode and the second electrode is a predetermined first direction, a second liquid crystal domain in which such a tilt direction is a predetermined second direction, a third liquid crystal domain in which such a tilt direction is a predetermined third direction and a fourth liquid crystal domain in which such a tilt direction is a predetermined fourth direction; a difference between any two among the first direction, the second direction, the third direction and the fourth direction is approximately equal to an integral multiple of 90°;
the first liquid crystal domain is close to at least a part of edges of the first electrode, and the at least a part includes a first edge portion, wherein an azimuthal angle component of an alignment regulation force caused by an oblique electric field generated in the vicinity of the first edge portion and an azimuthal angle component of an alignment regulation force caused by the second alignment film are opposite to each other;
the second substrate includes a first rib provided in an area corresponding to the first edge portion;
the first rib includes an inclining first side face, an inclining second side face located outer to the first side face, and an apex defined between the first side face and the second side face; and
the first rib is located such that the apex is located outer to the first edge portion and that the first edge portion overlaps the first side face.

2. The liquid crystal display device of claim 1, wherein the first direction has an angle exceeding 90° with respect to an azimuthal angle direction perpendicular to the first edge portion and directed to the inside of the first electrode.

3. The liquid crystal display device of claim 1, wherein a height h (μm) of the first rib, a width w (μm) of the first rib and a thickness d (μm) of the liquid crystal layer fulfill the relationship of the following expression 1:

$$5d \cdot \exp(-0.18w) \leq h \leq 12d \cdot \exp(-0.13w) \quad (1).$$

4. The liquid crystal display device of claim 3, wherein the height h (μm) of the first rib, the width w (μm) of the first rib and the thickness d (μm) of the liquid crystal layer fulfill the relationships of the following expressions (2), (3) and (4):

$$2 \leq d \leq 6 \quad (2)$$

$$10 \leq w \leq 30 \quad (3)$$

$$0.6 \leq h \leq d \quad (4).$$

5. The liquid crystal display device of claim 1, wherein the first edge portion is generally parallel to a vertical direction of a display plane.

6. The liquid crystal display device of claim 1, wherein the second liquid crystal domain is close to at least a part of the edges of the first electrode, and the at least a part includes a second edge portion, wherein an azimuthal angle component of an alignment regulation force caused by an oblique electric field generated in the vicinity of the second edge portion and an azimuthal angle component of an alignment regulation force caused by the second alignment film are opposite to each other; and
the second substrate includes a second rib provided in an area corresponding to the second edge portion.

7. The liquid crystal display device of claim 6, wherein the first direction and the second direction make an angle of about 180° with respect to each other.

8. The liquid crystal display device of claim 6, wherein the first edge portion and the second edge portion are generally parallel to the vertical direction of the display plane.

9. The liquid crystal display device of claim 1, wherein the first liquid crystal domain, the second liquid crystal domain, the third liquid crystal domain and the fourth liquid crystal domain are each adjacent to the others of the liquid crystal domains and are located in a matrix of 2 rows×2 columns.

10. The liquid crystal display device of claim 9, wherein the first liquid crystal domain, the second liquid crystal domain, the third liquid crystal domain and the fourth liquid crystal domain are located such that the tilt directions in adjacent liquid crystal domains among the first through fourth liquid crystal domains are different by 90° from each other.

11. The liquid crystal display device of claim 10, wherein where an azimuthal angle of a horizontal direction of the display plane is 0°, the first direction is about 45°, about 135°, about 225° or about 315°.

12. The liquid crystal display device of claim 1, further comprising a pair of polarizing plates facing each other with the liquid crystal layer interposed therebetween and located such that transmission axes thereof are generally perpendicular to each other;
wherein the first direction, the second direction, the third direction and the fourth direction each make an angle of about 45° with respect to the transmission axes of the pair of polarizing plates.

13. The liquid crystal display device of claim 1, wherein:
the liquid crystal layer contains the liquid crystal molecules having a negative dielectric anisotropy; and
a pretilt direction defined by the first alignment film and a pretilt direction defined by the second alignment film are different by about 90° from each other.

14. The liquid crystal display device of claim 1, wherein a pretilt angle defined by the first alignment film and a pretilt angle defined by the second alignment film are approximately equal to each other.

15. The liquid crystal display device of claim 1, wherein the first alignment film and the second alignment film are each an optical alignment film.

16. A liquid crystal display device, comprising:

a vertical alignment type liquid crystal layer;

a first substrate and a second substrate facing each other with the liquid crystal layer interposed therebetween;

a first electrode provided in the first substrate on the liquid crystal layer side and a second electrode provided in the second substrate on the liquid crystal layer side; and a first alignment film provided between the first electrode and the liquid crystal layer and a second alignment film provided between the second electrode and the liquid crystal layer;

wherein:

the liquid crystal display device includes a plurality of pixel areas located in a matrix;

each of the plurality of pixel areas includes a first liquid crystal domain in which a tilt direction of liquid crystal molecules at the center and in the vicinity thereof in a layer plane and in a thickness direction of the liquid crystal layer when a voltage is applied between the first electrode and the second electrode is a predetermined first direction, a second liquid crystal domain in which such a tilt direction is a predetermined second direction, a third liquid crystal domain in which such a tilt direction is a predetermined third direction and a fourth liquid crystal domain in which such a tilt direction is a predetermined fourth direction; a difference between any two among the first direction, the second direction, the third direction and the fourth direction is approximately equal to an integral multiple of 90°;

the first liquid crystal domain is close to at least a part of edges of the first electrode, and the at least a part includes a first edge portion, wherein an azimuthal angle component of an alignment regulation force caused by an oblique electric field generated in the vicinity of the first edge portion and an azimuthal angle component of an alignment regulation force caused by the second alignment film are opposite to each other;

the second substrate includes a first rib provided in an area corresponding to the first edge portion;

wherein a height h (μm) of the first rib, a width w (μm) of the first rib and a thickness d (μm) of the liquid crystal layer fulfill the relationship of the following expression 1:

$$5d \cdot \exp(-0.18w) \leq h \leq 12d \cdot \exp(-0.13w) \quad (1).$$

17. The liquid crystal display device of claim 16, wherein the height h (μm) of the first rib, the width w (μm) of the first rib and the thickness d (μm) of the liquid crystal layer fulfill the relationships of the following expressions (2), (3) and (4):

$$2 \leq d \leq 6 \quad (2)$$

$$10 \leq w \leq 30 \quad (3)$$

$$0.6 \leq h \leq d \quad (4).$$

* * * * *